(12) United States Patent
Konno et al.

(10) Patent No.: US 8,714,678 B2
(45) Date of Patent: May 6, 2014

(54) INKJET PRINTING DEVICE AND METHOD

(75) Inventors: Yuji Konno, Kawasaki (JP); Satoshi Seki, Kawasaki (JP); Hinako Iritani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 80 days.

(21) Appl. No.: 13/197,193

(22) Filed: Aug. 3, 2011

(65) Prior Publication Data

US 2012/0050365 A1 Mar. 1, 2012

(30) Foreign Application Priority Data

Aug. 31, 2010 (JP) .................................. 2010-194736

(51) Int. Cl.
*B41J 29/38* (2006.01)

(52) U.S. Cl.
USPC ............................................................ 347/14

(58) Field of Classification Search
USPC .............................. 347/12, 14, 41, 43, 96, 98
See application file for complete search history.

(56) References Cited

U.S. PATENT DOCUMENTS

| | | | |
|---|---|---|---|
| 4,622,561 A | 11/1986 | Koike | |
| 6,267,476 B1 * | 7/2001 | Kato et al. | 347/100 |
| 6,866,358 B2 | 3/2005 | Masuyama et al. | |
| 7,011,389 B2 | 3/2006 | Edamura et al. | |
| 7,130,083 B1 | 10/2006 | Konno et al. | |
| 7,399,044 B2 | 7/2008 | Masuyama et al. | |
| 7,407,277 B2 | 8/2008 | Yoneyama | |
| 7,477,422 B2 | 1/2009 | Konno et al. | |
| 7,588,306 B2 | 9/2009 | Masuyama et al. | |
| 2010/0053247 A1 | 3/2010 | Kakutani | |
| 2013/0271520 A1 | 10/2013 | Kakutani | |

FOREIGN PATENT DOCUMENTS

| | | |
|---|---|---|
| CN | 1572513 A | 2/2005 |
| CN | 101659149 A | 3/2010 |
| JP | 2002-307755 A | 10/2002 |
| JP | 2004-122496 A | 4/2004 |

OTHER PUBLICATIONS

Chinese Office Action dated Nov. 25, 2013, in related Chinese Patent Application No. 201110247420.6 (with English translation).

* cited by examiner

*Primary Examiner* — Stephen Meier
*Assistant Examiner* — Tracey McMillion
(74) *Attorney, Agent, or Firm* — Fitzpatrick, Cella, Harper & Scinto

(57) ABSTRACT

An inkjet printing device uses a print head including a first nozzle array for ink ejection and a second nozzle array for ejection of an image quality improvement liquid (CL), and the device prints an image on a print medium by repeating a print scan. The inkjet printing device includes a first controller for, during a first print scan, allowing nozzles on an upstream side of the first nozzle array in the conveying direction to eject the ink, and a second controller for, during the first print scan, allowing nozzles on an upstream side of the second nozzle array in the conveying direction to eject the liquid (CL) into an ink ejection area. In aaddition, a third controller, during a second print scan after the first print scan, allows nozzles on a downstream side of the second nozzle array in the conveying direction to eject the liquid (CL) into the ink ejection area.

28 Claims, 23 Drawing Sheets

|  | IMAGE CLARITY | | | | GLOSSINESS | | | |
|---|---|---|---|---|---|---|---|---|
| HIGHLIGHT PART | (a) | HIGH | (d) | HIGH | (a) | LOW | (d) | MIDDLE |
| HALFTONE PART | (b) | HIGH | (e) | MIDDLE | (b) | HIGH + | (e) | MIDDLE |
| SHADOW PART | (c) | MIDDLE | (f) | MIDDLE | (c) | MIDDLE | (f) | MIDDLE |

FIG.4

|  |  | INK | | | | | |
|---|---|---|---|---|---|---|---|
|  |  | 1 | 2 | 3 | 4 | 5 | 6 |
| PIGMENT DISPERSANT | 1 | 40 | 8 |  |  |  |  |
|  | 2 |  |  | 20 | 8 |  |  |
|  | 3 |  |  |  |  | 40 |  |
|  | 4 |  |  |  |  |  | 40 |
| GLYCERIN |  | 5.0 | 5.0 | 5.0 | 5.0 | 5.0 | 5.0 |
| DIETHYLENE GLYCOL |  | 5.0 | 5.0 | 5.0 | 5.0 | 5.0 | 5.0 |
| POLYETHYLENE GLYCOL 1000 |  | 5.0 | 5.0 | 5.0 | 5.0 | 5.0 | 5.0 |
| SURFYNOL (REGISTERED TRADE MARK) 465 |  | 1.0 | 1.0 | 1.0 | 1.0 | 1.0 | 1.0 |
| ION EXCHANGE WATER |  | 44 | 76 | 64 | 76 | 44 | 44 |

FIG.9

|  | IMAGE CLARITY | | | GLOSSINESS | | |
|---|---|---|---|---|---|---|
|  |  |  |  |  | ORNAMENTAL PORTION | NON-ORNAMENTAL PORTION |
| HIGHLIGHT PART | (a) HIGH | (d) HIGH | | (a) LOW | (d) LOW | MIDDLE |
| HALFTONE PART | (b) HIGH | (e) MIDDLE | | (b) HIGH + | (e) LOW | MIDDLE |
| SHADOW PART | (c) MIDDLE | (f) MIDDLE | | (c) MIDDLE | (f) LOW | MIDDLE |

FIG.21

INKJET PRINTING DEVICE AND METHOD

BACKGROUND OF THE INVENTION

1. Field of the Invention

The present invention relates to an inkjet printing device using colored ink containing a pigment-based color material and an image quality improvement liquid, and to an inkjet printing device configured to control a sense of gloss provided by images.

2. Description of the Related Art

In inkjet printing in which an image is formed on a print medium by applying ink ejected from a print head to a print medium to form dots, there has been a strong demand to print high-quality images on various print media. Furthermore, in particular, photorealistic print has recently been demanded. Thus, glossy paper, which provides image quality and tones equivalent to those of silver halide photography, is widely available on the markets.

For glossy paper, there are various demands for a sense of gloss provided by printed images. One of the demands is to print images with even gloss all over the print medium. To meet this demand, for example, Japanese Patent Laid-Open No. 2002-307755 discloses means for reducing gloss unevenness on the surface of printed matter with an image printed thereon; the gloss unevenness is inherent in pigment ink. The gloss unevenness is a problem resulting from a difference in glossiness between a printed area in which an image is printed with pigment ink and a non-printed area in which no image is printed. In Japanese Patent Laid-Open No. 2002-307755, whether a pigment-based colored ink is ejected through nozzles in a print head (whether ejection of the pigment-based colored ink is ON or OFF) is detected for each pixel. Transparent ink is applied to OFF pixels (the image in the non-printed area) with the colored ink not applied thereto. This makes the glossiness of the non-printed area equivalent to that of the printed area printed with the colored ink, improving gloss evenness.

On the other hand, there has been another demand to utilize a difference in the sense of gloss to mix glossy areas and less glossy areas together in the same print medium, thus exerting a special effect. For example, in a glossy photographic image, a less glossy character image may be desired to be printed. Printed matter with such images printed thereon exerts such an ornamental effect as to make the characters appear to bulge from the printed matter at a particular viewing angle, and can thus be used for "ornamental printing" applications for catalogs and graphic arts. Means using a colorless and transparent image quality improvement liquid for controlling the gloss may be used to realize these applications as described in Japanese Patent No. 4,040,417. Japanese Patent No. 4,040,417 discloses a method of controlling the glossiness in which when the image quality improvement liquid is applied, the number of scans performed by a print head and culling data used for each scan are changed so as to allow the printed matter to provide plural levels of sense of gloss using a simple configuration.

To uniformize the gloss of an image printed using pigment ink, it is necessary to mix dots of the pigment-based colored ink with dots of the image quality improvement liquid on the print medium instead of forming the colored ink and the image quality improvement liquid into separate layers, depending on the formation density of dots of the colored ink per unit print area. This is because the mixture of the dots of the colored ink and the dots of the image quality improvement liquid increases the likelihood of providing the surface shape with recesses and protrusions, thus suppressing the excessively high glossiness of certain gradation portions to make the gloss even at all gradation levels. This phenomenon will be described in the DESCRIPTION OF THE EMBODIMENTS section in detail.

On the other hand, to allow the effect of ornamental printing to be exerted by applying, to the print medium, the colorless and transparent image quality improvement liquid for controlling the gloss, a layer of the image quality improvement liquid (image quality improvement liquid layer) needs to be formed on a layer of the colored ink (colored ink layer) formed on the print medium, as an upper layer. That is, in order to achieve the ornamental printing, the image quality improvement liquid needs to be formed as what is called an overcoat layer.

As described above, to improve the gloss evenness of an image printed using the pigment-based colored ink, the image quality improvement liquid needs to be applied to the print medium as required so that the dots of the colored ink are mixed with the dots of the image quality improvement liquid to roughen the surface shape, thus reducing the mirror surface glossiness. On the other hand, for ornamental printing, the image quality improvement liquid needs to be overcoated on the colored ink. Japanese Patent Laid-Open No. 2002-307755 and Japanese Patent No. 4,040,417 do not disclose any technique for meeting both the above-described requirements.

Two functions can be simultaneously provided by having, as a print head for applying the image quality improvement liquid, two types of print heads, a print head for ornamental printing (print head for overcoating) and a print head for improving the gloss evenness (print head for dot mixed printing). However, in this case, another problem occurs: mounting of two types of print heads may increase costs and the size of the printing device.

SUMMARY OF THE INVENTION

Hence, an object of the present invention is to provide an inkjet printing device using pigment ink and which can achieve both ornamental printing and gloss evenness without the need for a significant increase in costs or an increase in device size.

The present invention meeting this object is an inkjet printing device using a print head including a first nozzle array in which a plurality of nozzles capable of ejecting ink containing a color material are arranged and a second nozzle array in which a plurality of nozzles capable of ejecting an image quality improvement liquid containing no color material are arranged, the inkjet printing device printing an image on a print medium by repeating a print scan in which the print head is moved in a main scan direction with the ink ejected from the print head and a conveying operation of conveying the print medium in a conveying direction crossing the main scan direction, the inkjet printing device including first control means for, during a first print scan, allowing nozzles positioned on an upstream side of the first nozzle array in the conveying direction to eject the ink onto the print medium; second control means for, during the first print scan, allowing nozzles positioned on an upstream side of the second nozzle array in the conveying direction to eject the image quality improvement liquid into an area on the print medium in which the ink has already been ejected; and third control means for, during a second print scan after the first print scan, allowing nozzles positioned on a downstream side of the second nozzle array in the conveying direction to eject the image quality improvement liquid into the area on the print medium into which the ink has already been ejected.

The present invention provides an inkjet printing device enabling printing with an image quality improvement liquid that serves to accomplish the two purposes, gloss control and ornamental printing, while avoiding a significant increase in costs and an increase in device size which may result from the provision of a plurality of print heads for image quality improvement liquids.

Further features of the present invention will become apparent from the following description of exemplary embodiments (with reference to the attached drawings).

BRIEF DESCRIPTION OF THE DRAWINGS

FIG. 4 is a diagram further illustrating the relationship between the dot formation state and both image clarity and glossiness illustrated in FIG. 3;

FIG. 9 is a diagram illustrating preparation of the six colored inks used in the embodiment of the present invention;

FIG. 21 is a diagram further illustrating the relationship between the dot formation state and both image clarity and glossiness illustrated in FIG. 20;

DESCRIPTION OF THE EMBODIMENTS

Embodiments of the present invention will be described below in detail. First, before description of the embodiments of the present invention, description will be given of (Method for estimating glossiness and image clarity), (Relationship between the dot formation state and both glossiness and image clarity), (Device configuration), and (Ink composition) according to the embodiments.

(Method for Evaluating Glossiness and Image Clarity)

The glossiness and image clarity of a surface of a print medium will be described on which evaluation of gloss evenness in a print image is based according to the embodiments of the present invention. Indicators used to evaluate a sense of gloss provided by print media or images include glossiness and image clarity. A method for evaluating the glossiness and image clarity will be described below.

Figure 1:
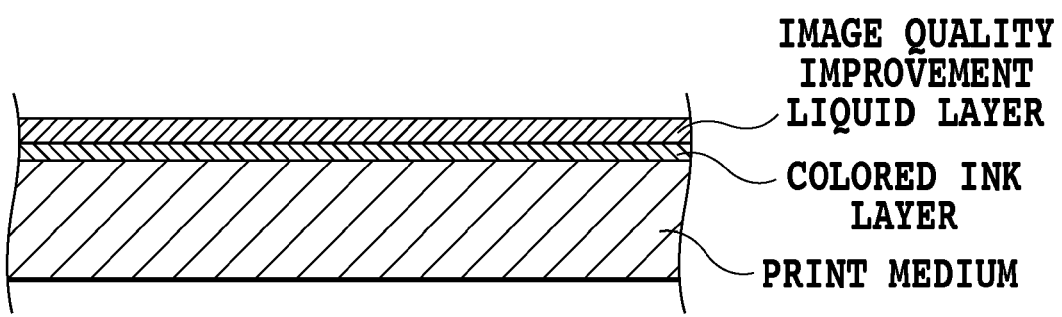
FIG. 1 is a diagram illustrating the relationship between an image quality improvement liquid layer and a colored ink layer for ornamental printing.
Figure 2A:
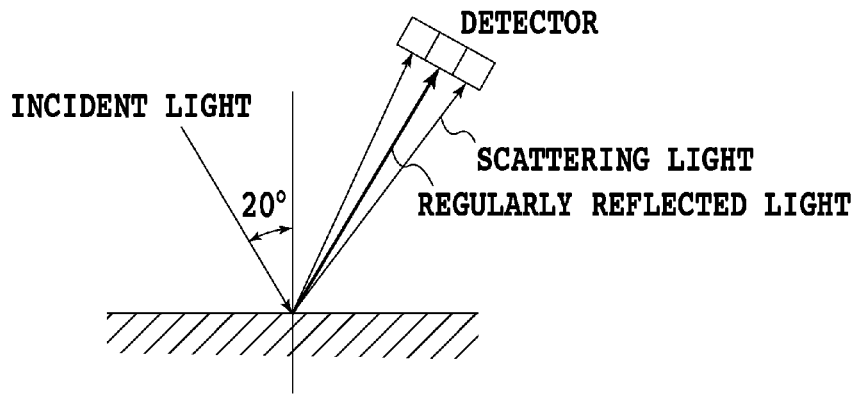
FIGS. 2A to 2D are diagrams illustrating glossiness and haze.
Figure 2B:
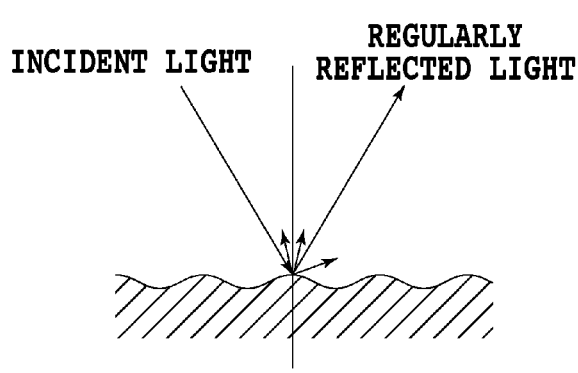
Figure 2D:
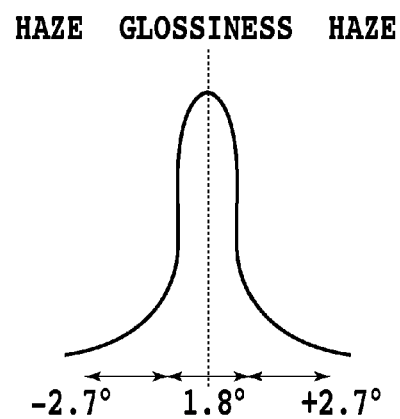

FIGS. 2A to 2D are diagrams illustrating glossiness and haze. As shown in FIG. 2A, the values of mirror surface glossiness (hereinafter referred to as glossiness) and haze can be determined by using a detector to detect light reflected by the surface of printed matter. The detector used may be B-4632 (Japanese name: Micro-haze Plus) manufactured by BYK-Gardener. The reflected light is distributed through a certain angle around the axis of regularly reflected light. As shown in FIG. 2D, the glossiness is detected, for example, within an opening width of 1.8° at the center of the detector. The haze is detected outside the opening width, for example, within the range of ±2.7°. That is, when the reflected light is observed, the glossiness is defined as the reflectance, with respect to incident light, of the regularly reflected light, corresponding to the central axis of the distribution. The haze or haze value is defined as a measurement of scattering light generated near the regularly reflected light in the distribution of the reflected light. The units of the glossiness and haze measured by the detector are dimensionless. The glossiness complies with K5600 in the JIS standard. The haze complies with DIS13803 in the ISO standard.

The image clarity is measured using the JIS H8686 "Method for measuring the image clarity of anode oxide films of aluminum and aluminum alloy" or the JIS K7105 "Method for testing the optical characteristics of plastic". The image clarity indicates the clarity of an image shown on a print medium. For example, if an illumination image shown on the print medium is blurred, the image exhibits a small image clarity value. Commercially available devices for measuring the image clarity include the image clarity measuring instrument ICM-1T (manufactured by Suga Test Instruments Co., Ltd.) and the image clarity measuring device GP-1S (manufactured by Optec); both the instrument and the device comply with the JIS standard.

Figure 2C:
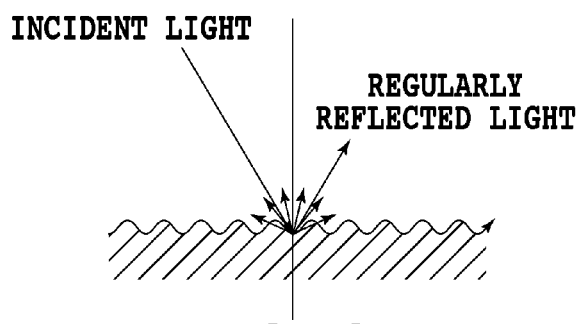

FIGS. 2B and 2C illustrate that the amount and direction of the reflected light vary depending on the roughness of surface of a print image. The print image in FIG. 2C has a rougher surface than that in FIG. 2B. As shown in these figures, the amount of the regularly reflected light decreases with increasing roughness of the surface as a result of scattering of the reflected light, resulting in smaller measured values of the glossiness and the image clarity. In the present embodiment, the glossiness is evaluated based on the magnitude relationship between the measured glossiness value and a target glossiness value. Furthermore, the image clarity is evaluated based on the magnitude relationship between the measured image clarity value and a target image clarity value. In both cases, a small measured value is evaluated to be low, whereas a large measured value is evaluated to be high.

(Relationship between the Dot Formation State and Both Glossiness and Image Clarity)

As described above, to uniformize the gloss of an image printed using pigment ink, it is necessary to mix dots of pigment-based colored ink with dots of a colorless and transparent image quality improvement liquid on the print medium instead of forming the colored ink and the image quality improvement liquid into separate layers, depending on the print duty of colored ink. The "print duty" as used herein refers to the density of dots formed in a unit print area on the print medium.

Figure 3:
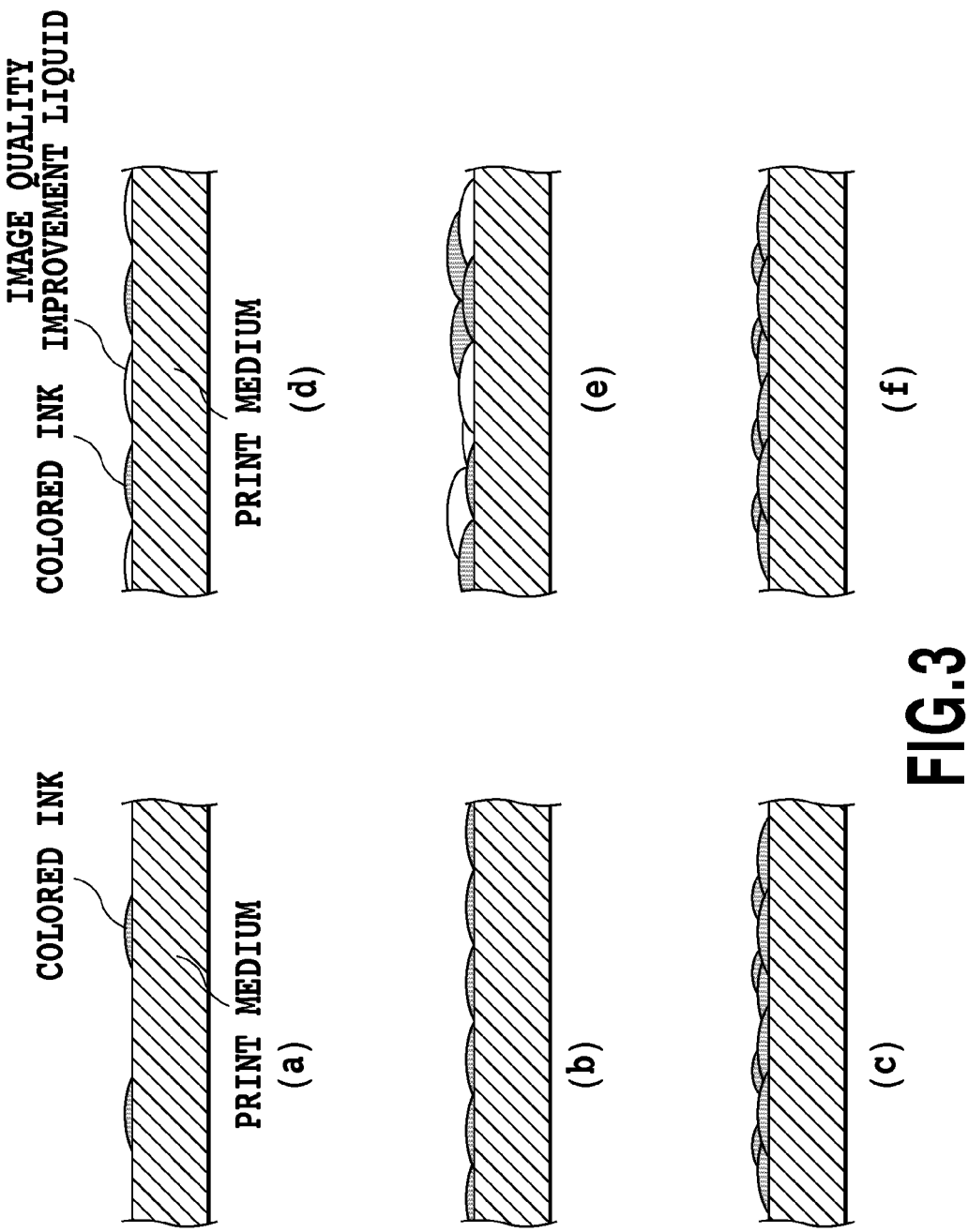
FIG. 3 is a diagram illustrating the relationship between both glossiness and image clarity and a state in which dots of colored ink and dots of an image quality improvement liquid for gloss evenness are formed on a print medium.

FIG. 3 is a diagram illustrating the relationship between the dot formation state and both glossiness and image clarity. In FIG. 3, (a) to (c) show that only the dots of the colored ink are formed on the print medium in accordance with the print duty. FIG. 3(a) shows the dot formation state in a highlight part in which the colored ink exhibits a relatively low dot density. FIG. 3(b) shows the dot formation state in a halftone part in which the colored ink exhibits a relatively high dot density. FIG. 3(c) shows the dot formation state in a shadow part in which the colored ink exhibits a high dot density. In FIG. 3, (d) to (f) illustrate that the image quality improvement liquid has been applied to (a) to (c), respectively, as required in order to make the senses of gloss provided by all gradation portions even.

In the highlight part shown in FIG. 3(a), the dot density is relatively low. Thus, with regard to the glossiness of the surface printed using the colored ink, the glossiness of the print medium proper has a higher contribution rate than that of the colored ink. The "glossiness" as used herein refers to the 20° mirror surface glossiness defined in the JIS. In general, the print medium has a lower glossiness than the pigment-based colored ink. Thus, the glossiness of the highlight part is perceived to be low. Hence, in the highlight part, as shown in FIG. 3(d), the image quality improvement liquid needs to be applied to a portion with no dot of the colored ink formed therein to increase the glossiness of the print surface, thus reducing the difference in glossiness between the highlight part and both the halftone part and the shadow part.

On the other hand, in the halftone part shown in FIG. 3(b), the colored ink exhibits a relatively high dot density, and the print medium is occupied by many dots of the colored ink. At this time, the print surface exhibits a very high glossiness owing to the high glossiness of the pigment-based colored ink. In particular, if the print state shown in FIG. 3(b) is formed using what is called light colored ink with a low pigment density, the 20° mirror surface glossiness exceeds 100. In contrast, through subject tests conducted to examine the optimum mirror surface glossiness, the present inventors have found that the preferable glossiness is between 60 and 80. The excessively high glossiness of the halftone part makes the printed matter appear glaring and gives the impression that the printed matter is excessively glossy. This is not preferable. However, even when the image quality improvement liquid is overcoated on the colored ink in order to reduce the glossiness, if the image quality improvement liquid is coated in the form of a layer with a smooth surface, the excessively high glossiness cannot be reduced to a desired level. Thus, as shown in FIG. 3(e), dots of the colored ink and dots of the image quality improvement liquid are formed on the print medium so as to mix together to some degree, thus creating recesses and protrusions on the print surface. This increases the amount of scattering light in the measurement of the glossiness, while reducing the reflectance of regularly reflected light with respect to incident light. As a result, the excessively high glossiness can be suppressed. At this time, the image clarity (how clearly the image is shown on the print surface), another element determining the sense of gloss, is affected and decreases slightly. However, balancing with the other gradation portions makes the entire gloss even.

In the shadow part shown in FIG. 3(c), a portion in which dots of the colored ink overlap involves a large amount of solids such as a color material and dispersed resin in the pigment ink, with the solids bulging from the front layer. Thus, recesses and protrusions are formed all over the print surface. At this time, the image clarity of the print surface is slightly lower than that in the other gradation portions. However, the mirror surface glossiness is not excessively high and exhibits a value of between about 60 and about 80, which corresponds to the above-described preferable 20° mirror surface glossiness. Hence, in FIG. 3(c), the sense of gloss need not be adjusted using the image quality improvement liquid, and thus the image quality improvement liquid is not applied. Thus, FIG. 3(f) shows the same state as that shown in FIG. 3(c).

FIG. 4 is a table illustrating the relationship among the senses of gloss (image clarity and 20° mirror surface glossiness) obtained in (a) to (f) of FIG. 3 described above. The symbols (a) to (f) in FIG. 4 correspond to the states shown in the respective subfigures of FIG. 3. The rank "High +" in FIG. 4 indicates a level higher than "High". Applying the image quality improvement liquid to the highlight part increases the glossiness to about a middle level. Applying the image quality improvement liquid to the halftone part reduces the glossiness to about a middle level. Thus, the glossiness becomes even in all the gradation portions including the shadow part, which originally exhibits approximately the middle level of glossiness.

(Device Configuration)

Figure 5:
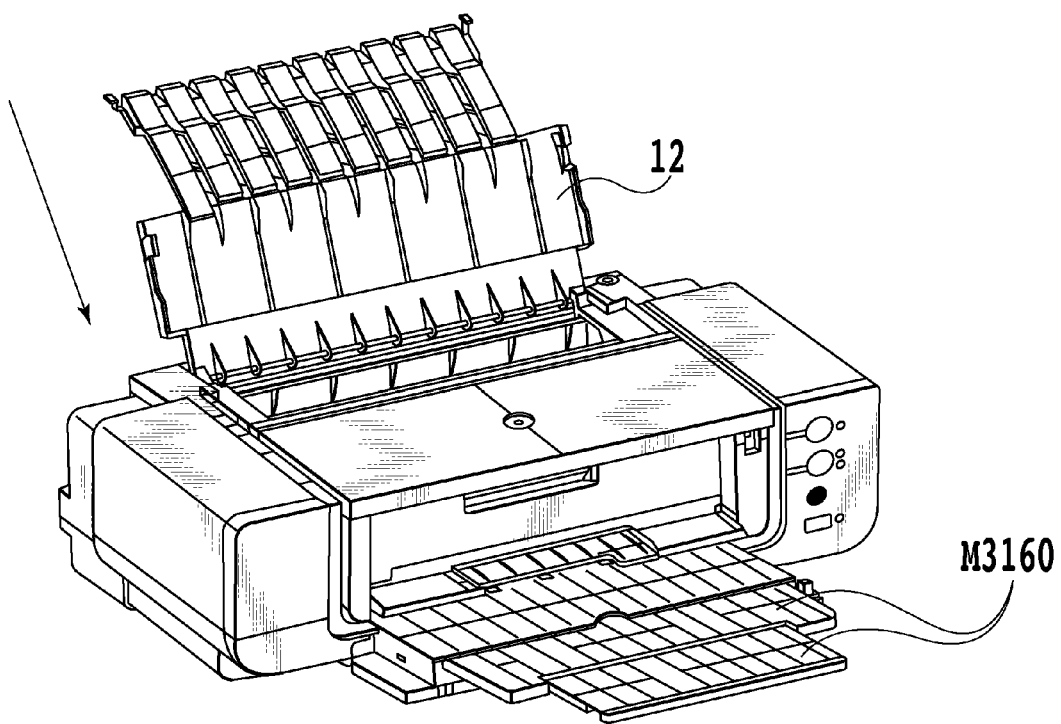
FIG. 5 is a perspective view showing the appearance of an inkjet printing device applied in an embodiment of the present invention.

FIG. 5 is a perspective view showing the appearance of the inkjet printing device applied in the present embodiment. Furthermore, FIG. 6 is a perspective view showing the interior of the inkjet printing device.

In the present embodiment, in FIG. 5, a print medium is inserted from a supply tray 12 in a direction shown by an arrow. The print medium is intermittently conveyed, while an image is formed on the print medium. The print medium is then discharged from a discharge tray M3160.

Figure 6:
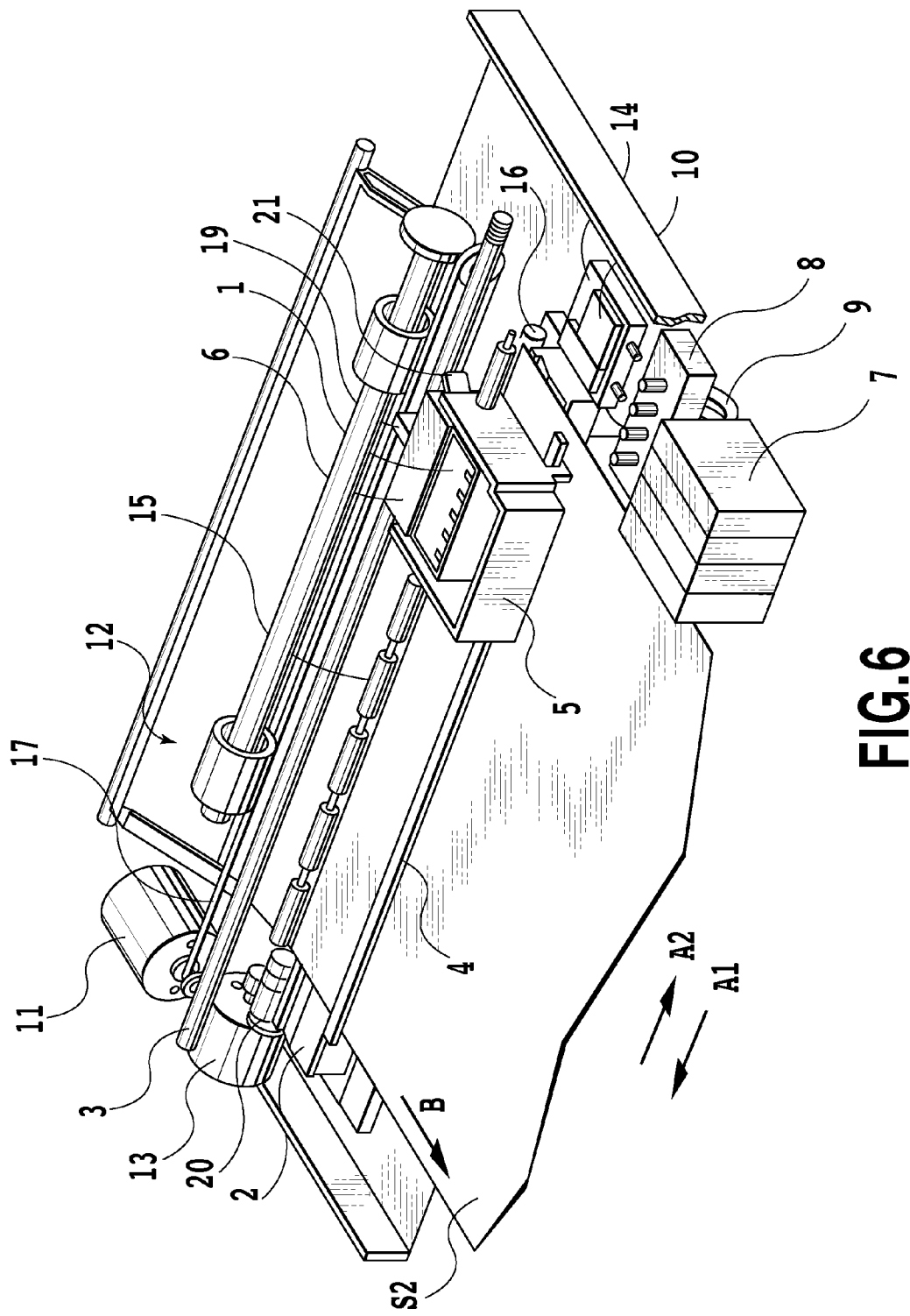
FIG. 6 is a perspective view illustrating the interior of the inkjet printing device.
Figure 7:
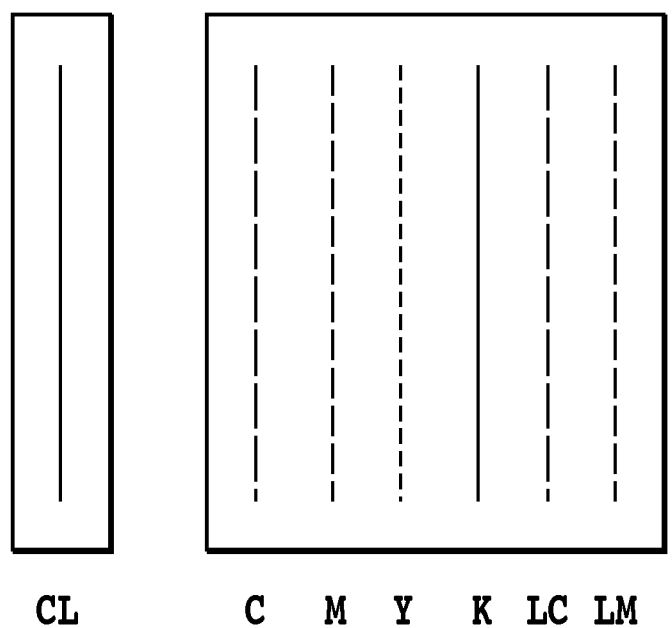
FIG. 7 is a diagram showing the arrangement of nozzle arrays for six colored inks and a nozzle array for a colorless and transparent image quality improvement liquid in the inkjet printing device according to the embodiment of the present invention.

In FIG. 6, a print head 1 mounted in a carriage 5 reciprocates in the directions of arrows A1 and A2 along a guide rail. During the reciprocation, the print head 1 ejects ink through nozzles to form an image on a print medium S2. The print head 1 includes a plurality of nozzle groups corresponding to, for example, inks in different colors and an image quality improvement liquid. The nozzle groups are used to eject, for example, colored inks in six colors (cyan (C), magenta (M), yellow (Y), black (K), light cyan (LC), and light magenta (LM)) and a colorless and transparent image quality improvement liquid (CL). The inks in the respective colors and the colorless and transparent image quality improvement liquid are stored in respective ink tanks (not shown in the drawings), from which the inks and the image quality improvement liquid are fed to the print head 1. FIG. 7 shows the arrangement state of nozzle arrays in the print head; the nozzle arrays include nozzle arrays for the colored inks in six colors (first nozzle arrays) and a nozzle array for the colorless and transparent image quality improvement liquid (second nozzle array). In each of the nozzle arrays, a plurality of nozzles capable of ejecting the ink or the image quality improvement liquid are arranged in a direction crossing a main scan direction (in the present example, the direction orthogonal to the main scan direction). Each of the nozzles includes an electrothermal transducing element (heater) or a piezo element as an energy generating element for generating ink ejection energy. If the electrothermal transducing element is used, the electrothermal transducing element generates heat to bubble the ink so that the resultant bubbling energy can be utilized to eject the ink through an ejection port at the tip of the nozzle.

In the present embodiment, the ink tanks and the print head 1 integrally form a head cartridge 6 mounted in a carriage 5.

Furthermore, the driving force of a carriage motor 11 is transmitted to the carriage 5 by a timing belt 17 to reciprocate the carriage 5 in the directions of arrows A1 and A2 (main scan direction) along a guide shaft 3 and a guide rail 4. During this carriage movement, the position of the carriage is detected by an encoder sensor 21 provided on the carriage 5 when the encoder sensor 21 reads a linear scale 19 provided along the direction in which the carriage moves. The reciprocation starts printing on the print medium. At this time, the print medium S2 is fed from the supply tray 12 and sandwiched between a conveyance roller 16 and a pinch roller 15. The print medium S2 is then conveyed to a platen 2.

When the print head 1 carries out printing for one scan while moving in the direction A1 together with the carriage 5, the conveyance motor 13 drives the conveyance roller 16 via a linear wheel 20. Then, the print medium S2 is conveyed by a predetermined amount in the direction of arrow B corresponding to a sub-scan direction (the conveying direction of the print medium). The sub-scan direction crosses the main scan direction (in the present example, the sub-scan direction is orthogonal to the main scan direction). Thereafter, the print medium S2 is printed with the carriage 5 scanning in the direction A2. As shown in FIG. 6, a head cap 10 and a recovery unit 14 are provided at a home position to intermittently carry out a process of recovering the print head 1 as required.

When one print medium is completely printed by repeating the above-described processes, the print medium is discharged. Thus, the printing of the one print medium is completed.

Figure 8:
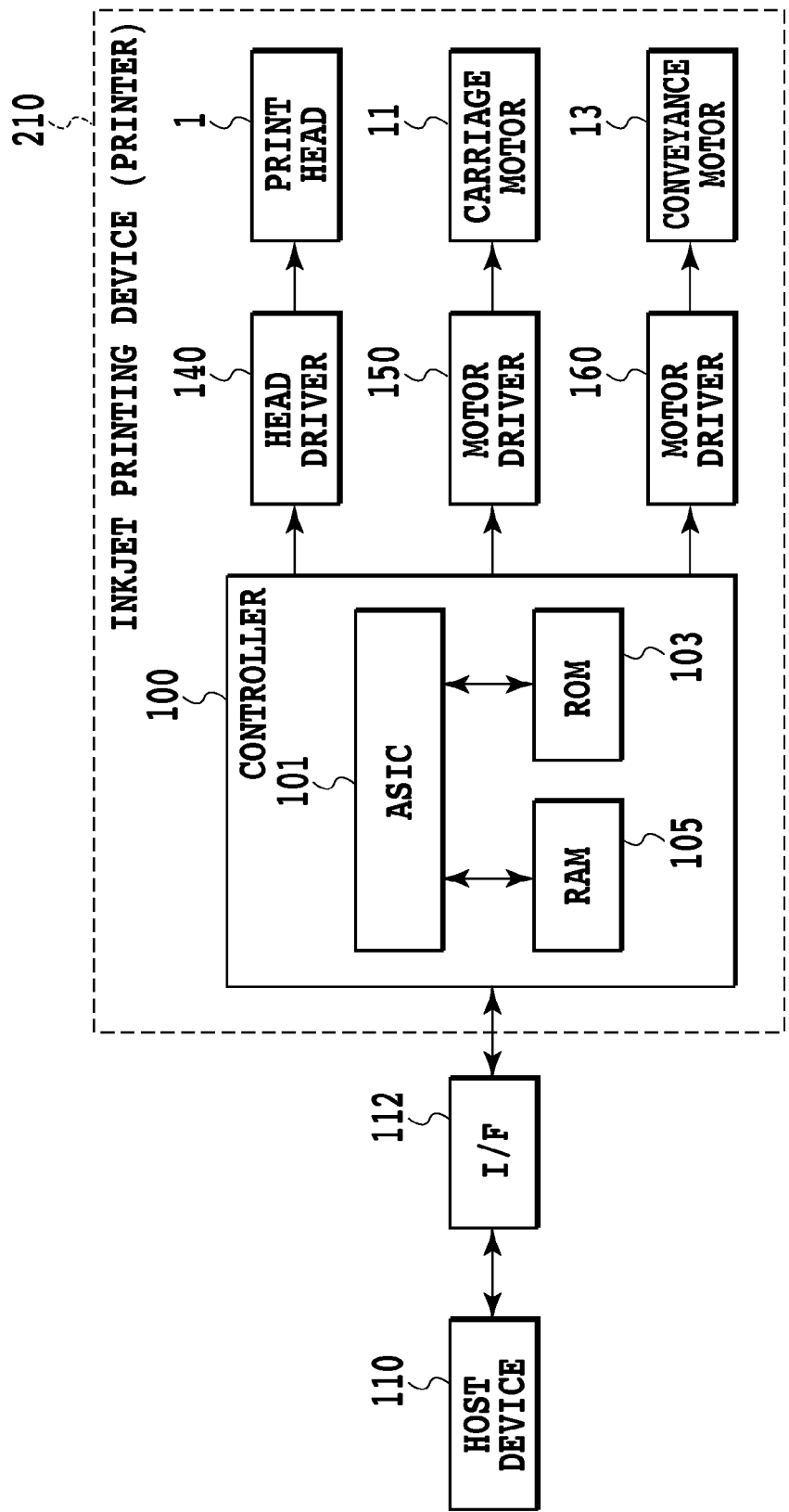
FIG. 8 is a block diagram showing a control arrangement of the inkjet printing device according to the embodiment of the present invention.

FIG. 8 is a block diagram showing a control arrangement of an inkjet printing device according to the present embodiment. An inkjet printing device 210 includes a controller 100, a head driver 140, and motor drivers 150 and 160.

The controller 100 is a main control section and includes, for example, an ASIC 101 in the form of a microcomputer, a ROM 103, and a RAM 105. The ROM 103 is configured to store a dot arrangement pattern, a mask pattern, and other fixed data. The RAM 105 includes an area in which print data is expanded and a work area. The ASIC 101 carries out a series of processes starting with reading of a program from the ROM 103 and ending with printing of the print data on the print medium. The head driver 140 drives the print head 1 in accordance with the print data. The motor driver 150 drives the carriage motor 11. The motor driver 160 drives the conveyance motor 13.

A host device 110 is a source of image data and may be a computer configured to create and process data on images for printing (print data) or in the form of a reader for image reading or the like. The print data will be described below in detail. The print data, other commands, a status signal, and the like are transmitted to and received from the controller 100 of the inkjet printing device 210 via an interface (I/F) 112.

(Ink Composition)

Now, description will be given of the colored ink (hereinafter referred to as the colored ink or simply the ink) containing a pigment color material used in the inkjet printing device according to the present embodiment, and the colorless and transparent image quality improvement liquid used for controlling the glossiness.

First, the components of the ink will be described.

[Aqueous Medium]

The ink used in the present invention may be an aqueous medium containing water and water-soluble organic solvent. The content (mass percents) of the water-soluble organic solvent in the ink is preferably at least 3.0 mass percents and at most 50.0 mass percents based on the total mass of the ink. Furthermore, the content (mass percents) of water in the ink is preferably at least 50.0 mass percents and at most 95.0 mass percents based on the total mass of the ink.

Specifically, for example, the following may be used as the water-soluble organic solvent: alkyl alcohols with a carbon number of 1 to 6 such as methanol, ethanol, propanol, propanediol, butanol, butanediol, pentanol, pentanediol, hexanol, and hexanediol; amides such as dimethylformamide and dimethylacetamide; ketone or keto alcohols such as acetone and diacetone alcohols; ethers such as tetrahydrofuran or dioxane; polyalkylene glycols with an average molecular weight of 200, 300, 400, 600, or 1,000 such as polyethylene glycol and polypropylene glycol; alkylene glycols with an alkylene group with a carbon number of 2 to 6 such as ethylene glycol, propylene glycol, butylene glycol, triethylene glycol, 1, 2, 6-hexanetriol, thiodiglycol, hexylene glycol, or diethylene glycol; lower alkylether acetate such as polyethylene glycol monomethyl ether acetate; glycerin; lower alkyl ethers of polyalcohol such as ethylene glycol monomethyl (or ethyl)ether, diethylene glycol methyl (or ethyl)ether, and triethylene glycol monomethyl (or ethyl)ether; and N-methyl-2-pyrollidone, 2-pyrollidone, and 1,3-dimethyl-2-imidazolidinone. Furthermore, ionic water (ion exchange water) is preferably used as the water.

[Pigment]

Carbon black or an organic pigment is preferably used as the pigment. The content (mass percents) of the pigment in the ink is preferably at least 0.1 mass percent and at most 15.0 mass percents based on the total mass of the ink.

For black ink, carbon black such as furnace black, lamp black, acetylene black, or channel black is preferably used as the pigment. Specifically, the following commercially available carbon blacks may be used: Raven: 7000, 5750, 5250, 5000ULTRA, 3500, 2000, 1500, 1250, 1200, 1190ULTRA-II, 1170, and 1255 (manufactured by Columbian Chemicals Company); Black Pearls L, Regal: 330R, 400R, 660R, Mogul L, Monarch: 700, 800, 880, 900, 1000, 1100, 1300, 1400, 2000, and Valcan XC-72R (manufactured by Cabot Corporation); Color Black: FW1, FW2, FW2V, FW18, FW200, S150, S160, S170, Printex: 35, U, V, 140U, 140V, Special Black: 6, 5, 4A, and 4 (manufactured by Degussa AG); and No. 25, No. 33, No. 40, No. 47, No. 52, No. 900, No. 2300, MCF-88, MA600, MA7, MA8, and MA100 (manufacture by Mitsubishi Chemical Corporation). Alternatively, carbon black newly prepared for the present invention may be used. Of course, the present invention is not limited to these carbon blacks and may use any conventional carbon black. Furthermore, the present invention is not limited to the carbon black. Particulates of a magnetic substance such as magnetite or ferrite, titanium black, or the like may be used as the pigment. Specifically, for example, the following may be used as the organic pigment: a water-insoluble azo pigment such as toluidine red, toluidine maroon, benzidine yellow, or pyrazolone red; a water-soluble azo pigment such as ritol red, helio bordeaux, pigment scarlet, or permanent red 2B; a derivative from a vat dye such as alizarine, indanthrene, or thioindigo maroon; a phthalocyanine pigment such as phthalocyanine blue or phthalocyanine green; a quinacridone pigment such as quinacridone red or quinacridone magenta; a perylene pigment such as perylene red or perylene scarlet; an isoindolinone pigment such as isoindolinone yellow, or isoindolinone orange; a benzimidazolone pigment such as benzimidazolone yellow, benzimidazolone orange, or benzimidazolone red; a pyranthrone pigment such as pyranthrone red or pyranthrone orange; an indigo pigment; a condensed azo pigment; a thioindigo pigment; a diketopyrrolopyrrole pigment; and flavanthrone yellow, acylamido yellow, quinophthalone yellow, nickel azo yellow, copper azomethine yellow, perinone orange, anthrone orange, dianthraquinonyl red, or dioxazine violet. Of course, the present invention is not limited to these organic pigments.

Furthermore, when the organic pigments are indicated by color index (C. I.) numbers, for example, the present invention can use the following: C. I. pigment yellow: 12, 13, 14, 17, 20, 24, 74, 83, 86, 93, 97, 109, 110, 117, 120, 125, 128, 137, 138, 147, 148, 150, 151, 153, 154, 166, 168, 180, 185, and the like; C. I. pigment orange: 16, 36, 43, 51, 55, 59, 61, 71, and the like; C. I. pigment red: 9, 48, 49, 52, 53, 57, 97, 122, 123, 149, 168, 175, 176, 177, 180, 192, and the like; C. I. pigment red: 215, 216, 217, 220, 223, 224, 226, 227, 228, 238, 240, 254, 255, 272, and the like; C. I. pigment violet: 19, 23, 29, 30, 37, 40, 50, and the like; C. I. pigment blue: 15, 15:1, 15:3, 15:4, 15:6, 22, 60, 64, and the like; C. I. pigment green: 7, 36, and the like; C. I. pigment brown: 23, 25, 26, and the like; and C. I. pigment black: 7. Of course, the present invention is not limited to these organic pigments.

[Dispersant]

Any dispersant may be used to disperse such a pigment as described above in the aqueous medium provided that the dispersant is a water-soluble resin. In particular, the dispersant preferably has an average molecular weight of at least 1,000 and at most 30,000 and more preferably at least 3,000 and at most 15,000. The content (mass percents) of the dispersant in the ink is preferably at least 0.1 mass percent and at most 5.0 mass percents based on the total mass of the ink.

Specifically, for example, the following may be used as the dispersant: styrene, vinyl naphthalene, an aliphatic alcohol ester of an α,β-ethylenic unsaturated carboxylic acid, acrylic acid, maleic acid, itaconic acid, fumaric acid, vinyl acetate, vinyl pyrolidone, acrylamide, or a polymer using a derivative or the like of any of the above-described substances as a monomer. One or more of the monomers constituting the polymer is preferably a hydrophilic monomer and may be a block copolymer, a random copolymer, a graft copolymer, or a salt thereof. Alternatively, a natural resin such as rosin, shellac, or starch may be used. These resins are soluble to a water solution of a base. That is, the resins are preferably alkaline-soluble.

[Surfactant]

To adjust the surface tension of the ink forming an ink set, a surfactant such as an anionic surfactant, a nonionic surfactant, or an ampholytic surfactant is preferably used. Specifically, the following may be used as the surfactant: polyoxyethylene alkyl ether, polyoxyethylene alkyl phenol, an acetylene glycol compound, an acetylene glycol ethylene oxide adduct, or the like.

[Other Components]

The ink forming the ink set may contain, in addition to the above-described components, moisture retaining solids such as urea, a urea derivative, trimethylolpropane, or trimethylolethane. The content (mass percents) of moisture retaining solids in the ink is preferably at least 0.1 mass percent and at most 20.0 mass percents and more preferably at least 3.0 mass percents and at most 10.0 mass percents based on the total mass of the ink. The ink forming the ink set may contain, in addition to the above-described components, a pH adjuster, a corrosion inhibitor, a preservative, a fungicide, an antioxidant, a reduction inhibitor, or an evaporation enhancer as required.

Now, the ink used in the present embodiment will be specifically described. The present invention is not limited by examples described below unless departing from the spirits thereof. The "parts" and "percents (%)" as used herein are based on the mass unless otherwise specified.

[Preparation of Pigment Dispersion Liquids 1 to 4]

Pigment dispersion liquids 1 to 4 are prepared according to the following procedure. In the description below, the dispersant refers to a water solution obtained by neutralizing a styrene-acrylic acid copolymer with an acid number of 200 and an average molecular weight of 10,000 with a 10 mass-percent water solution of sodium hydroxide.

<Preparation of the Pigment Dispersant 1 Containing C. I. Pigment Red 122>

First, 10 parts of the pigment (C. I. pigment red 122), 20 parts of the dispersant, and 70 parts of ion exchange water are mixed together. The mixture is dispersed for 3 hours using a batch-type vertical sand mill. Thereafter, coarse particles are removed by a centrifugal separation process. Moreover, the mixture is filtered under pressure by a cellulose acetate filter with a pore size of 3.0 µm (manufactured by ADVANTEC MFS, Inc.). Thus, the pigment dispersant 1 with a pigment concentration of 10 mass percents is obtained.

<Preparation of the Pigment Dispersant 2 Containing C. I. Pigment Blue 15:3>

First, 10 parts of the pigment (C. I. pigment blue 15:3), 20 parts of the dispersant, and 70 parts of ion exchange water are mixed together. The mixture is dispersed for 5 hours using the batch-type vertical sand mill. Thereafter, coarse particles are removed by the centrifugal separation process. Moreover, the mixture is filtered under pressure by the cellulose acetate filter with a pore size of 3.0 µm (manufactured by ADVANTEC MFS, Inc.). Thus, the pigment dispersant 2 with a pigment concentration of 10 mass percents is obtained.

<Preparation of the Pigment Dispersant 3 Containing C. I. Pigment Yellow 74>

First, 10 parts of the pigment (C. I. pigment yellow 74), 20 parts of the dispersant, and 70 parts of ion exchange water are mixed together. The mixture is dispersed for 1 hour using the batch-type vertical sand mill. Thereafter, coarse particles are removed by the centrifugal separation process. Moreover, the mixture is filtered under pressure by the cellulose acetate filter with a pore size of 3.0 µm (manufactured by ADVAN- TEC MFS, Inc.). Thus, the pigment dispersant 3 with a pigment concentration of 10 mass percents is obtained.

<Preparation of the Pigment Dispersant 4 Containing C. I. Pigment Black 7>

First, 10 parts of the pigment (C. I. pigment black 7), 20 parts of the dispersant, and 70 parts of ion exchange water are mixed together. The mixture is dispersed for 3 hours using the batch-type vertical sand mill. A peripheral speed for the dispersion is set to be double that in the preparation of the pigment dispersant 1. Thereafter, coarse particles are removed by the centrifugal separation process. Moreover, the mixture is filtered under pressure by the cellulose acetate filter with a pore size of 3.0 μm (manufactured by ADVANTEC MFS, Inc.). Thus, the pigment dispersant 4 with a pigment concentration of 10 mass percents is obtained.

[Preparation of the Ink]

Inks 1 to 6 are prepared by mixing components shown in FIG. 9 together, sufficiently stirring the mixture, and filtering the mixture under pressure by the cellulose acetate filter with a pore size of 0.8 μm (manufactured by ADVANTEC MFS, Inc.).

Now, the colorless and transparent image quality improvement liquid will be described which is used in the present embodiment to control the gloss.

[Preparation of the Image Quality Improvement Liquid]

A liquid composition L with the composition shown below is prepared using a styrene (St)-acrylic acid (AA) copolymer C (St/AA=70/30 (mass percents), molecular weight: 10,500, and measured acid number: 203). Potassium hydroxide is used as a basic substance, and the addition amount is adjusted so that the liquid composition has a pH of 8.0.

Styrene-acrylic acid copolymer C: 2 parts
Glycerin: 7 parts
Diethylene glycol: 5 parts
Water: 86 parts The image quality improvement liquid prepared as described above is used to control the gloss. The image quality improvement liquid can be used in the inkjet printing device in order to make the gloss even in all the gradation portions of a print image as well as for ornamental printing. The image quality improvement liquid is not limited by the above-described preparation examples as long as similar effects are exerted.

Embodiments of the present invention will be described below in detail.

First Embodiment

A first embodiment of the present invention will be described in detail.

Figure 10:
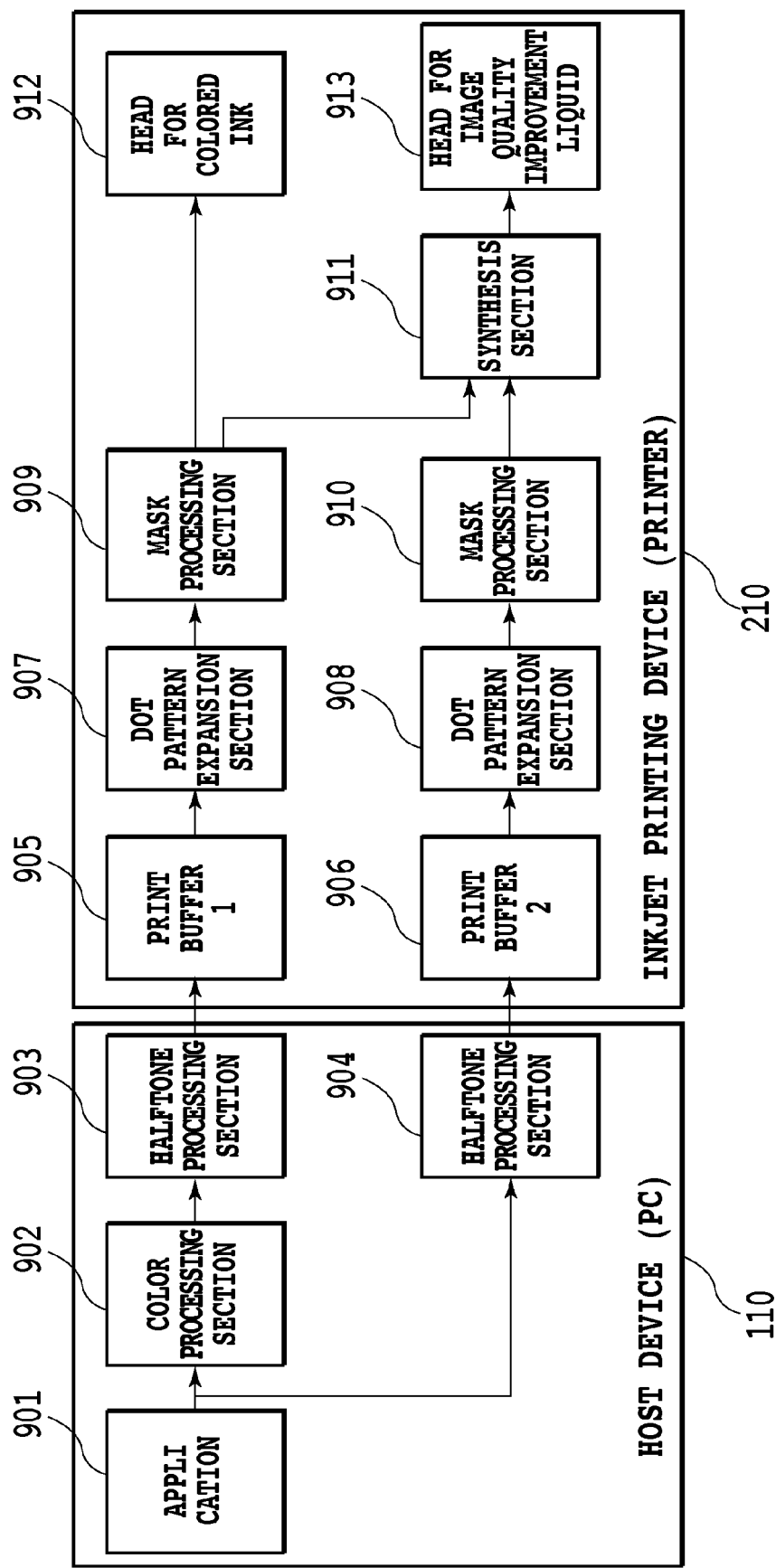
FIG. 10 is a block diagram showing an image processing arrangement of the inkjet printing device according to the present invention.

FIG. 10 is a block diagram showing an image processing arrangement of the inkjet printing device according to the present invention. It is assumed that in the present invention, the colorless and transparent image quality improvement liquid is used to control the gloss of a print image, and more specifically to make the gloss even in all the gradation areas (this purpose is hereinafter indicated by the expression "for gloss evenness") and to provide ornamental printing (this purpose is hereinafter indicated by the expression "for ornamental printing"). Here, the "ornamental printing" as used herein refers to a process of applying the image quality improvement liquid to a print image on a print medium to make the gloss of the area with the image quality improvement liquid applied thereto lower than that of the surrounding areas so as to exert such an effect (ornamental effect) as to make the area appear bulging.

First, the flow of a process of generating print data for the colored ink and the image quality improvement liquid for gloss evenness will be described.

Reference numeral 901 denotes an application on a PC. The application 901 inputs 8 bits of image for each of the colors R, G, and B, a total of 24 bits of image data, to a color processing section 902. The color processing section 902 converts the RGB image data into signals for the colored inks and a signal for the colorless and transparent image quality improvement liquid (hereinafter referred to as CL) used in the inkjet printing device. In the present example, six colored ink colors, cyan (C), magenta (M), yellow (Y), black (K), light cyan (LC), and light magenta (LM), are used in the inkjet printing device as described above. However, the present invention is not limited to these colors. The signals output by the color processing section 902 contain a total of 84 bits, that is, 12 bits for each color, in order to ensure gradation.

Reference numeral 903 denotes a halftone processing section. The halftone processing section 903 carries out pseudo half-toning process such as error diffusion on the input 12-bit (=4,096 values) multivalued signal for each color to convert the signal into data with N values (N is smaller than 4,096). Specifically, the N is, for example, about 3 to 16. Thus, multivalued half-toning is carried out such that 2 to 4 bits are used for each color. The present embodiment will be described in conjunction with the multivalued half-toning. However, the present invention is not limited to the multivalued half-toning. Binary half-toning may be used.

Reference numeral 905 denotes a print buffer 1. The above-described processing ending with the half-toning process is carried out by the host device (PC) 110. The subsequent processing is carried out by the inkjet printing device main body. Thus, the N-value data resulting from the half-toning process carried out by the halftone processing section 903 is temporarily stored in the print buffer 1 (905).

Figure 11:
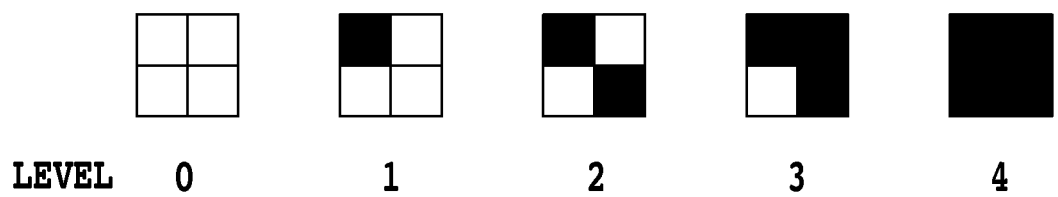
FIG. 11 is a diagram illustrating a dot pattern used in the inkjet printing device according to the present invention.

Reference numeral 907 denotes a dot pattern expansion section. The dot pattern expansion section 907 expands the N-value data input by the print buffer 1 (905) into a dot pattern with corresponding N types of gradations. This example will be described with reference to FIG. 11. In the example illustrated in FIG. 11, 5-value data at levels 0 to 4 is expanded into a corresponding dot pattern with 2×2 pixels. Blacked-out pixels mean ON, indicating that dots are formed at the pixels. White pixels mean OFF, indicating that no dots are formed at the pixels.

Reference numeral 909 denotes a mask processing section. A multipass printing process is print scanning in which an image is formed by allowing the print head to scan the same print area a plurality of times. In the multipass printing process, the mask processing section 909 uses a culling pattern (hereinafter referred to as a mask pattern) based on the dot pattern resulting from the expansion in order to cull the print data for each of the plurality of scans.

Figure 12:
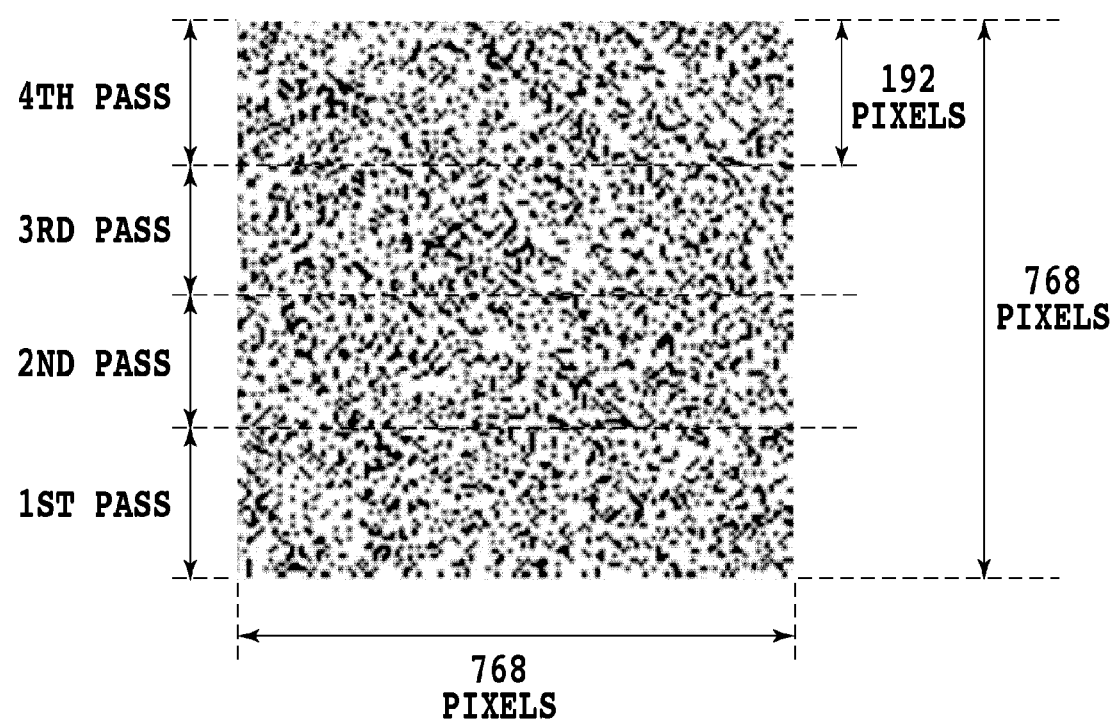
FIG. 12 is a diagram illustrating a mask pattern used for common multipass printing.

Now, the mask pattern will be described. FIG. 12 shows a common mask pattern. The mask pattern shown in FIG. 12 is an example of a four-pass mask pattern with which printing is completed by four scans. The mask pattern blacks out ON pixels at which dots are formed in accordance with the print data, while outlining OFF pixels at which no dots are formed. Thus, the print data is randomly culled. The size of the mask pattern corresponds to 768 pixels in length and 768 pixels in width. The vertical direction corresponds to the direction of the nozzle arrays in the print head. The horizontal direction corresponds to the main scan direction in which the print head scans. The number (768) of the pixels in the vertical direction is equal to that (768) of the nozzles in the print head. As shown by a dotted line in FIG. 12, the 768 pixels in the vertical direction are divided into patterns for the first to fourth passes each of which patterns has 192 (=¼ of 768) pixels. The mask patterns for the first to fourth passes are complementary with one another. In the present example, the mask patterns for the first to fourth passes have almost the same print duty, that is, a print duty of about 25%.

Figure 13:
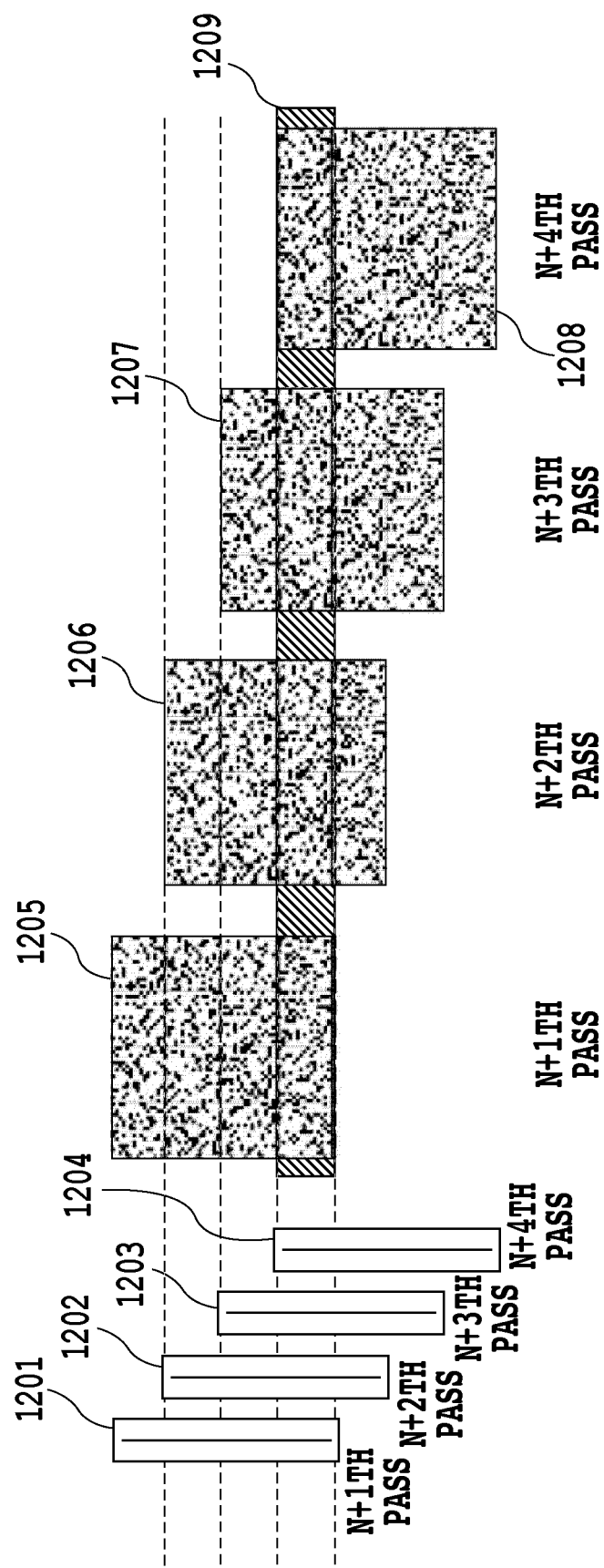
FIG. 13 is a diagram illustrating a multipass printing process using the mask pattern illustrated in FIG. 12.

FIG. 13 illustrates a multipass printing process using the common mask pattern shown in FIG. 12. In FIG. 13, the multipass printing process will be described in conjunction with a print head for one color for facilitation of description. Reference numerals 1201 to 1204 denote the print head. FIG. 13 shows that when multipass printing with four passes is carried out, the print medium is sequentially conveyed in the sub-scan direction, with the position of the print head relatively displaced from the same area of the print medium. Reference numerals 1205 to 1208 denote images printed during the N+1th pass to the N+4th pass. Reference numeral 1209 denotes an overlapping area printed during all of the four passes.

Figure 14:
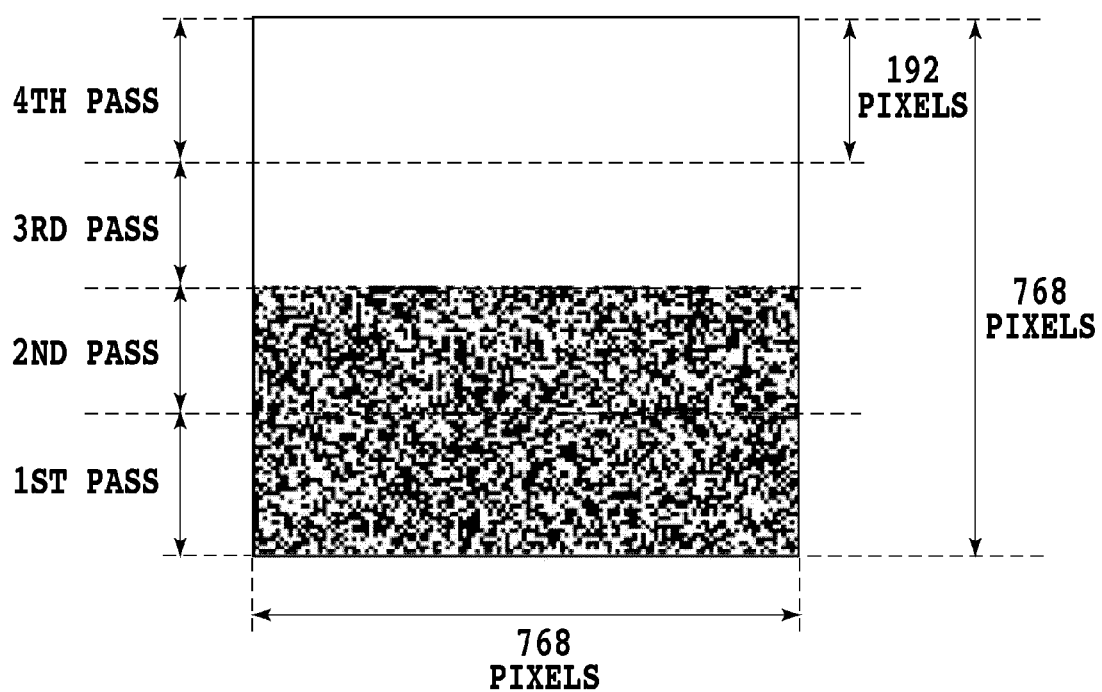
FIG. 14 is a diagram illustrating mask patterns for the colored ink and for gloss evenness which are used in a first embodiment of the present invention.

A characteristic mask pattern used in the present embodiment will be described with reference to FIG. 14. The mask pattern according to the present invention is different from the common four-pass mask pattern shown in FIG. 12 in that ON pixels are present only in portions corresponding to the first and second passes, with no ON pixels present in portions corresponding to the third and fourth passes. That is, image formation is substantially achieved by multipass printing with two passes. Each of the images printed during the first and second passes, respectively, has a print duty of about 50%. The mask pattern shown in FIG. 14 is applied to all of the seven colors, that is, the colored inks in the six colors C, M, Y, K, LC, and LM and the colorless image quality improvement liquid (the image quality improvement liquid for gloss evenness) CL. As described in the (Relationship between the dot formation state and both glossiness and image clarity) section, to make the gloss even in all the gradation areas, it is necessary to mix dots of the colored ink with dots of the image quality improvement liquid to some degree instead of applying the colored ink and the image quality improvement liquid in the form of the respective layers. To achieve this, it is effective to apply the colored ink and the image quality improvement liquid during the same scan. Such a mask pattern as shown in FIG. 14 is used both for the application of the colored ink and for the application of the image quality improvement liquid.

Now, the process flow in FIG. 10 in which print data is generated will be described again. Reference numeral 912 denotes a head for the colored ink included in the print heads of the inkjet printing apparatus. Culling carried out by the mask processing section 909 results in culled print data for the colored ink (first print data) and culled print data for the image quality improvement liquid for gloss evenness (second print data). The culled, first print data for the colored ink is transmitted to the head for the colored ink 912, which is then driven. The culled, second print data for the image quality improvement liquid for gloss evenness is synthesized, in a synthesis section 911, with culled print data for an image quality improvement liquid for ornamental printing (third print data) described below. The resultant print data is transmitted to a head for the image quality improvement liquid 913. Data generation for the image quality improvement liquid will be described below.

Figures 15A, 15B:
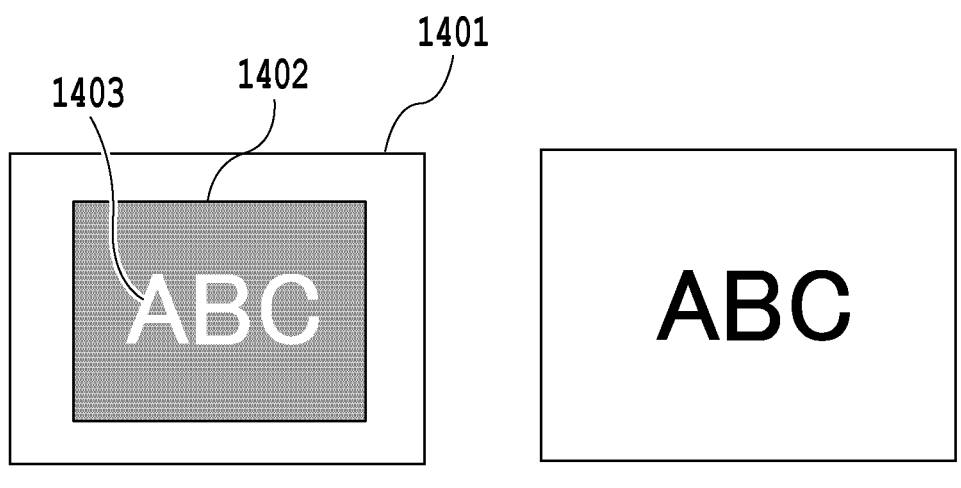
FIGS. 15A and 15B are diagrams illustrating a manner of using an image quality improvement liquid for ornamental printing as well as an ornamental effect thereof.

Now, a method for applying the image quality improvement liquid to ornamental printing for exerting an ornamental effect on an image will be described. FIG. 15A is a diagram illustrating a manner of using the image quality improvement liquid for ornamental printing. Reference numeral 1401 denotes a print medium. Reference numeral 1402 denotes an image print area (image area) on the print medium. An image is printed in the image area 1402 with the colored ink. The characters "ABC" shown by 1403 are ornamentally printed on the image area 1402 with the colored ink. Furthermore, the characters "ABC" shown in FIG. 15B is print data used to apply the image quality improvement liquid for ornamental printing. Applying the image quality improvement liquid in the area with the colored ink already applied therein exerts the effect (ornamental effect) of changing the gloss of the area to make the characters appear bulging.

With reference again to FIG. 10, the flow of a process for generating print data for the image quality improvement liquid for ornamental printing (third print data) will be described. For such ornamental printing as shown in FIG. 15A described above, the application 901 generates such third print data as shown in FIG. 15B which data is used to apply the image quality improvement liquid for ornamental printing. The print data is used only for the image quality improvement liquid for ornamental printing CL. The print data is multivalued data created separately from normal print data for the colored ink using the functions of the application 901. As described above, the first and second print data for the colored ink and the image quality improvement liquid for gloss evenness output by the color processing section 902 each have 12 bits in view of gradation. On the other hand, the third print data for the image quality improvement liquid for ornamental printing does not require very high gradation levels. Thus, 8-bit data, that is, 256 gradation levels, are output.

The halftone processing section 904 carries out a halftoning process on the input multivalued print data for the image quality improvement liquid for ornamental printing to convert the print data into M-value data where the M is smaller than 256.

Reference numerals 906 and 908 denote a print buffer 2 and a dot pattern expansion section, respectively. The print buffer 2 and the dot pattern expansion section provide functions similar to those of the print buffer 1 (905) and the dot pattern expansion section 907 in the flow of processing of the data for the colored ink and the image quality improvement liquid for gloss evenness. Thus, description of the print buffer 2 and the dot pattern expansion section is omitted.

Figure 16:
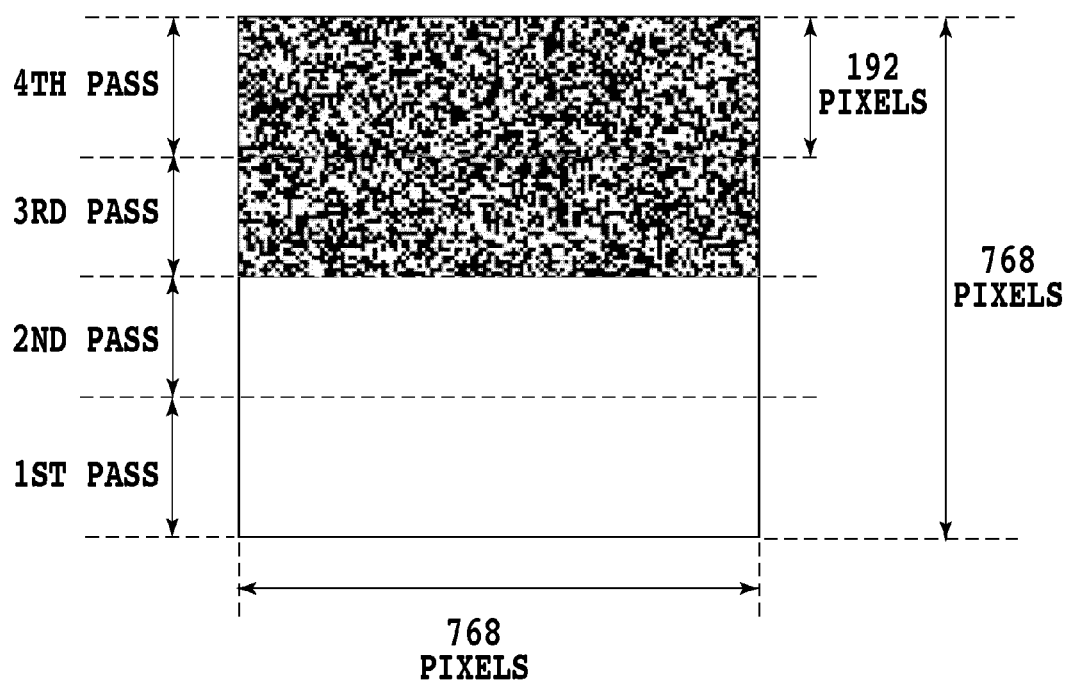
FIG. 16 is a diagram illustrating a mask pattern for ornamental printing used in the first embodiment of the present invention.

Reference numeral 910 denotes a mask processing section. With reference to FIG. 16, a mask pattern used to apply the image quality improvement liquid for ornamental printing (the mask pattern is hereinafter referred to as a mask pattern for ornamental printing or a third mask pattern) will be described. The mask patterns shown in FIG. 16 have shapes corresponding to vertical inversion of the mask patterns shown in FIG. 14 and used to apply the colored ink and the image quality improvement liquid for gloss evenness (the mask patterns are hereinafter referred to as a mask pattern for colored ink and a mask pattern for gloss evenness or a first mask pattern and a second mask pattern). That is, ON pixels are present only in portions corresponding to the third and fourth passes, with no ON pixels present in portions corresponding to the first and second passes.

Figure 17A:
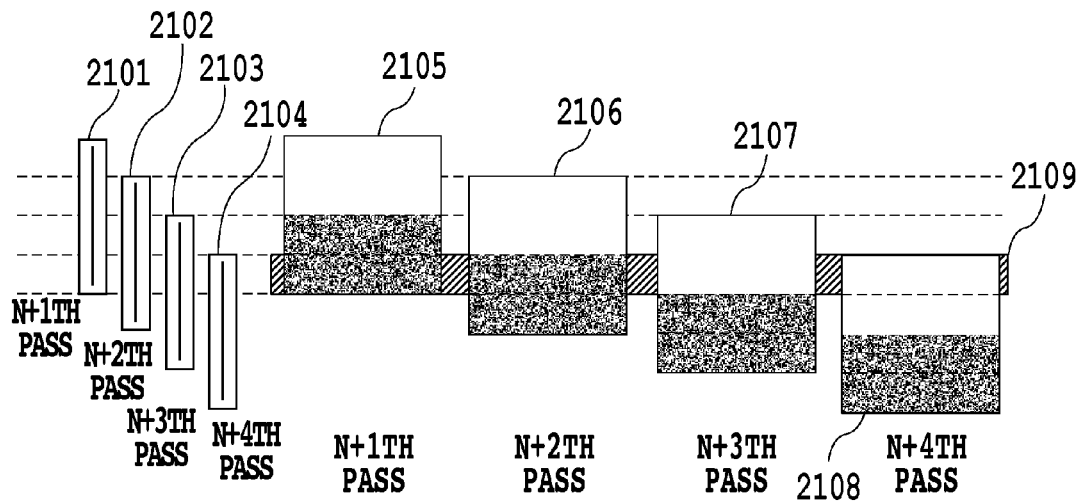
FIG. 17A is a diagram showing a manner of using the mask pattern for the colored inks and for gloss evenness in multipass printing.
Figure 17B:
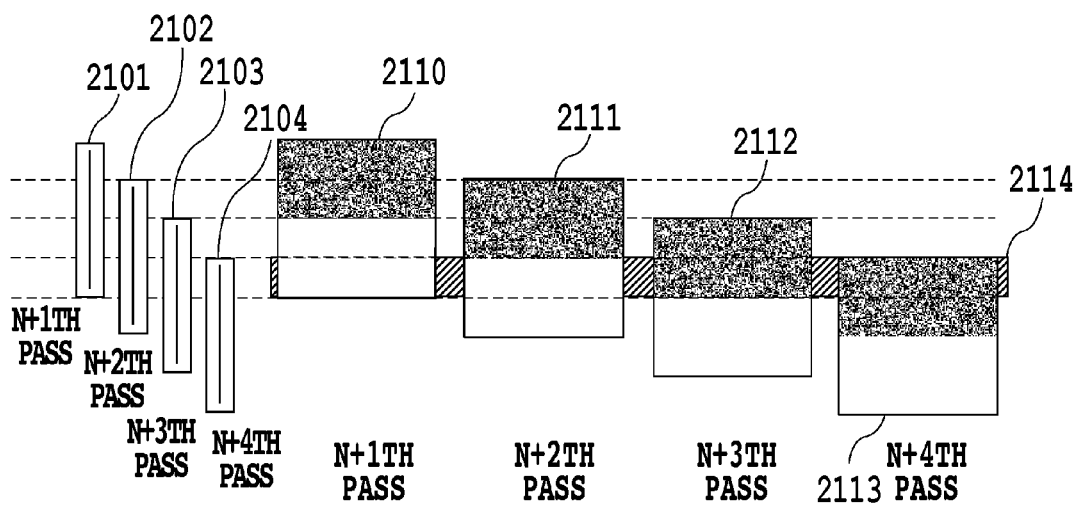
FIG. 17B is a diagram showing a manner of using the mask pattern for ornamental printing in the multipass printing.

Now, with reference to FIG. 17A and FIG. 17B, description will be given of a manner of using, during multipass printing, the colored ink and gloss evenness mask patterns in FIG. 14 used in the mask processing section 909 and the ornamental printing mask pattern in FIG. 16 used in the mask processing section 910. In FIG. 17A and FIG. 17B, the manner will be described in conjunction with a print head for one color for facilitation of description.

Reference numerals 2101 to 2104 in FIG. 17A and FIG. 17B denote the print head. FIG. 17A and FIG. 17B show that when multipass printing with four passes is carried out, the print medium is sequentially conveyed in the sub-scan direction, with the position of the print head relatively displaced from the same areas 2109 and 2114 of the print medium. FIG. 17A shows multipass printing using the mask patterns for colored ink and for gloss evenness in FIG. 14. In FIG. 17A, during former two passes, that is, the N+1th and N+2th passes (during the first multipass printing), an image is printed with the colored ink. During the same scan, the image quality improvement liquid for gloss evenness is applied in the same area as needed. Furthermore, FIG. 17B shows multipass printing using the mask pattern for ornamental printing. In FIG. 17B, during latter two passes, that is, the N+3th and N+4th passes (during the second multipass printing), an image is printed with the image quality improvement liquid for ornamental printing. That is, to allow the colored ink to be applied, only the mask pattern for colored ink in FIG. 14 is used for the multipass printing as shown in FIG. 17A. Additionally, to allow the image quality improvement liquid to be applied, not only the mask pattern for gloss evenness in FIG. 14 but also the mask pattern for ornamental printing is used for the multipass printing as shown in FIG. 17A and FIG. 17B.

Further description will be given with reference again to the flow in FIG. 10. Reference numeral 911 denotes a synthesis section. Here, the second print data for the image quality improvement liquid for gloss evenness culled by the mask processing section 909 is synthesized with the third print data for the image quality improvement liquid for ornamental printing culled by the mask processing section 910. In the two mask patterns used for the culling process for the image quality improvement liquid, data for a pass area in which ON pixels are present in one of the mask patterns is exclusive from data for a pass area in which ON pixels are present in the other mask pattern and vice versa as shown in FIG. 14 and FIG. 16. Thus, a bit operator for the synthesis may be a simple bit OR operator. The synthesis section 911 synthesizes the culled data for the image quality improvement liquids for gloss evenness and for ornamental printing. The synthesized data is transmitted to the head for the image quality improvement liquid 913, which is thus driven.

Figure 18:
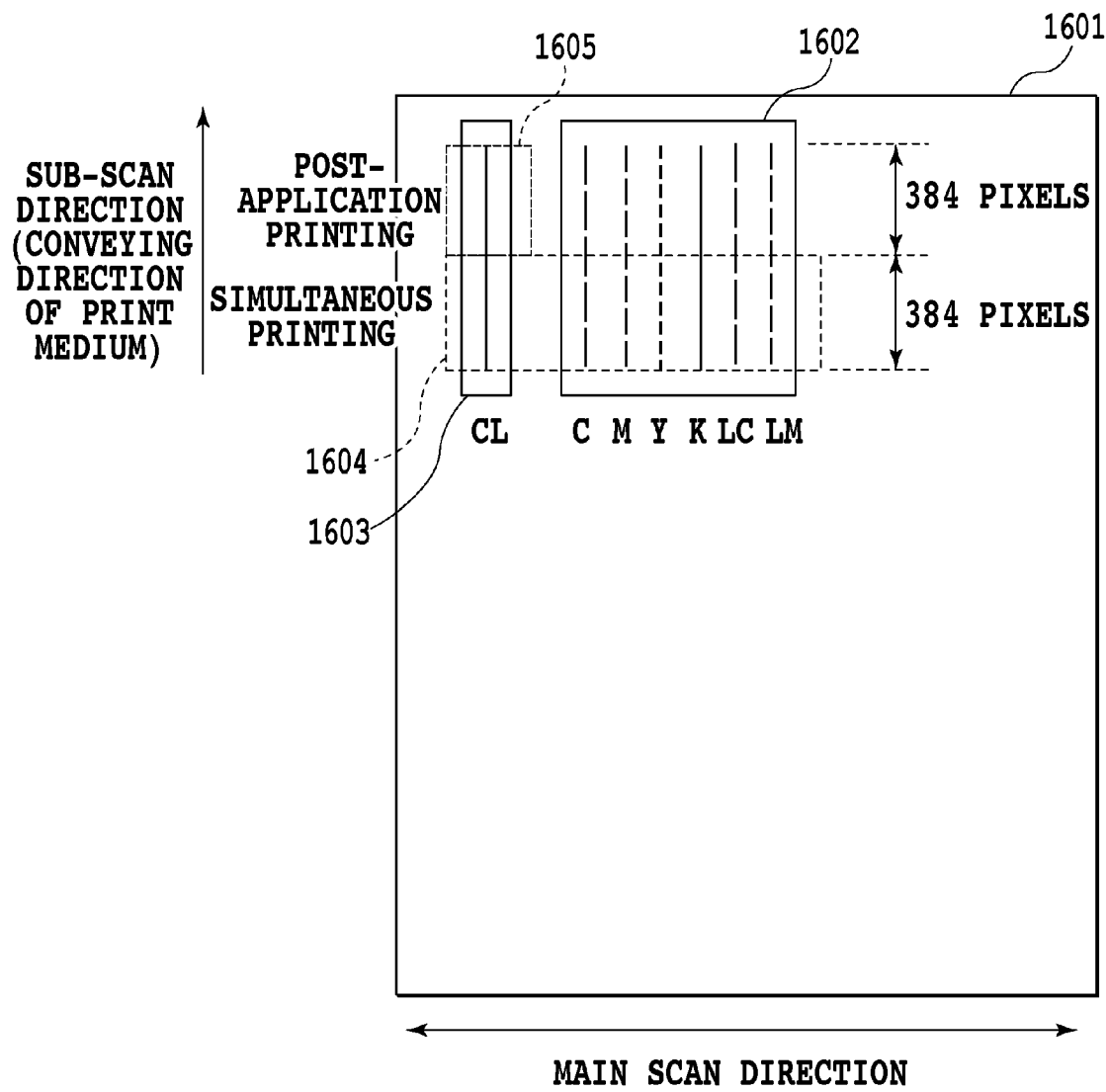
FIG. 18 is a diagram illustrating that the colored inks and the image quality improvement liquid are applied onto the print medium according to the first embodiment of the present invention.

With reference to FIG. 18, description will be given of a manner of actually applying the colored ink and the image quality improvement liquid onto the print medium in the flow of the print data processing described above with reference to FIG. 10. Reference numeral 1601 in FIG. 18 denotes a print medium. Furthermore, reference numeral 1602 denotes a head for the colored ink, and reference numeral 1603 denotes a head for the image quality improvement liquid. The two heads form the print head of the inkjet printing device. Each of the head for the colored ink 1602 and the head for the image quality improvement liquid 1603 includes one or more nozzle arrays in each of which a plurality of nozzles are arranged in the sub-scan direction (the conveying direction of the print medium). As shown in FIG. 18, the nozzle arrays are arranged in juxtaposition in the main scan direction in which the print head moves.

Reference numeral 1604 denotes an area of the head used for the colored ink and an area of the head used for the image quality improvement liquid in order to make the gloss even. The two heads apply the colored ink and the image quality improvement liquid in the same area of the print medium 1601 during the same print scan (first print scan). This operation is hereinafter referred to as simultaneous printing. During this print scan, the colored ink and/or the image quality improvement liquid is applied onto the print medium through those of the plurality of nozzles in the first and/or second nozzle array which are positioned on an upstream side in the sub-scan direction.

Furthermore, reference numeral 1605 denotes an area used for ornamental printing of the head for the image quality improvement liquid. After an image is printed, with the colored ink, in the area of the print medium 1601 by the head for the colored ink, the area of the print medium 1601 moves to the area 1605 of the head used for the image quality improvement liquid. Thus, in the print scan (second print scan) following the printing of the image with the colored ink, the image quality improvement liquid for ornamental printing is applied to the image printed portion. This operation is hereinafter referred to as post-application printing. During this print scan, the image quality improvement liquid is applied onto the print medium through those of the plurality of nozzles in the second nozzle array which are positioned on a downstream side in the sub-scan direction.

Figure 19:
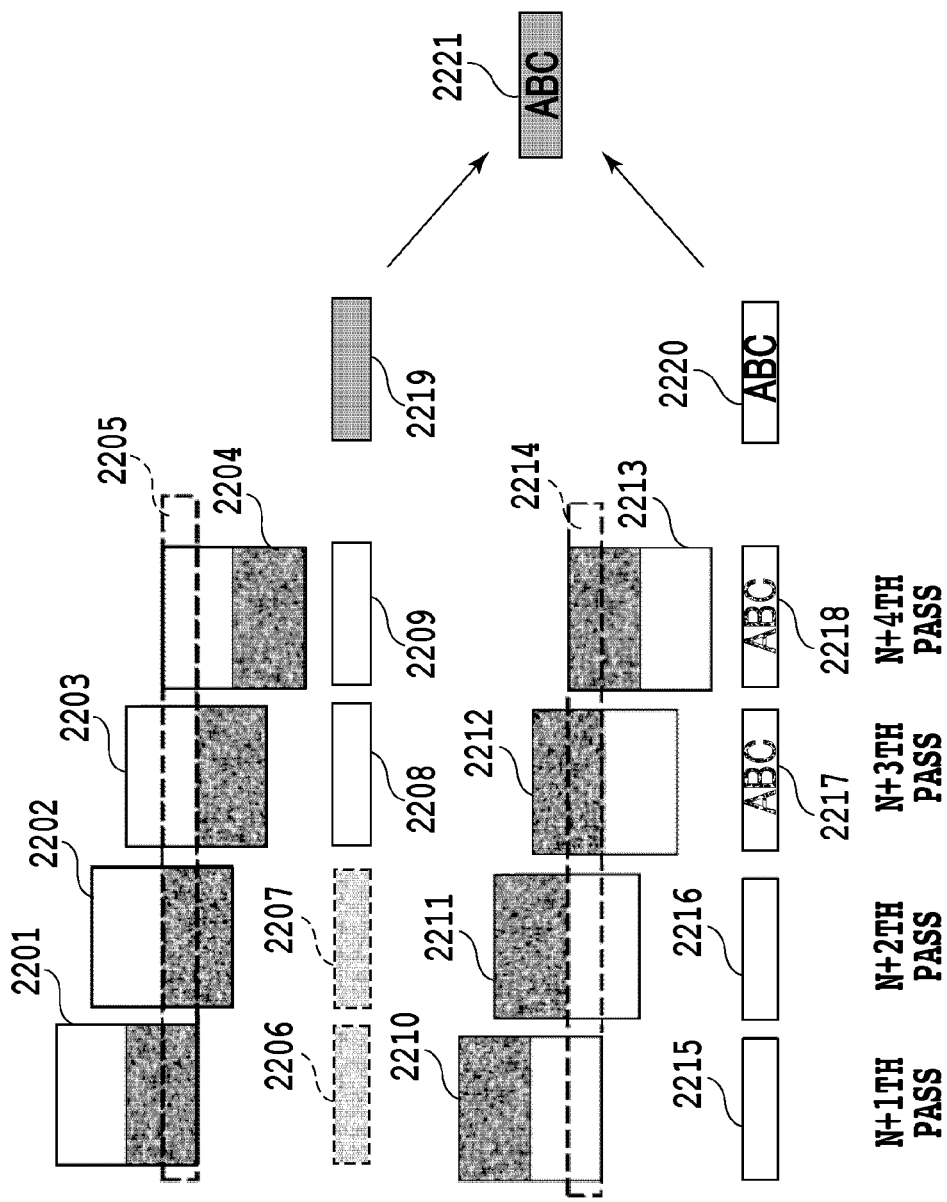
FIG. 19 is a schematic diagram showing that the image quality improvement liquid for gloss evenness and the image quality improvement liquid for ornamental printing are applied onto the print medium.

FIG. 19 schematically illustrates a manner of applying, onto the print medium, the image quality improvement liquid applied simultaneously with the colored ink (image quality improvement liquid for gloss evenness) and the image quality improvement liquid for post-application printing (image quality improvement liquid for ornamental printing). FIG. 19 shows that when multipass printing with four passes is carried out, the positions of the print heads are relatively displaced from the same areas 2205 and 2214 of the print medium.

During the N+1th and N+2th print passes illustrated in FIG. 19, images are printed with the colored ink in a culling manner, using the first mask pattern for colored ink as shown at 2201 and 2202. At this time, like the colored ink, the simultaneously provided image quality improvement liquid (image quality improvement liquid for gloss evenness) is applied in the area 2205 on the print medium as shown at 2206 and 2207, in a culling manner based on the second mask pattern as shown at 2201 and 2202. Subsequently, during the N+3th and N+4th print passes, the first mask pattern for colored ink and the second mask pattern for gloss evenness are used as shown at 2203 and 2204. At this time, neither the colored ink nor the image quality improvement liquid for gloss evenness is applied in the area 2205 as shown at 2208 and 2209. Thus, the second mask pattern for gloss evenness allows the image quality improvement liquid for gloss evenness to be applied in the area 2205 on the print medium as shown at 2219 where the images 2206, 2207, 2208, and 2209 are superimposed on one another.

On the other hand, for the image quality improvement liquid for ornamental printing, during the N+1th and N+2th print passes, the third mask pattern for ornamental printing is used as shown at 2210 and 2211. At this time, the image quality improvement liquid for ornamental printing is not applied in the area 2214 as shown at 2215 and 2216. Subsequently, during the N+3th and N+4th print passes, the third mask pattern for ornamental printing is used as shown at 2212 and 2213. At this time, the image quality improvement liquid for ornamental printing is applied in the area 2214 on the print medium in a culling manner based on the third mask pattern as shown at 2217 and 2218. Thus, the third mask pattern for ornamental printing allows the image quality improvement liquid for ornamental printing to be applied in the area 2214 on the print medium as shown at 2220 where the images 2215, 2216, 2217, and 2218 are superimposed on one another. The second print data and the third print data are synthesized into such print data as shown at 2221; the second print data is shown at 2219 and results from the image quality improvement liquid intended for gloss evenness, and the third print data is shown at 2220 and results from the image quality improvement liquid intended for ornamental printing. After the image quality improvement liquid for gloss evenness is applied onto the print medium based on the second print data shown at 2219, the image quality improvement liquid for ornamental printing is applied onto the print medium based on the third print data shown at 2220. Hence, the image quality improvement liquid for gloss evenness applied based on the second data 2219 can be present under the image quality improvement liquid for ornamental printing corresponding to "ABC" in the synthesized print data 2221.

Figure 20:
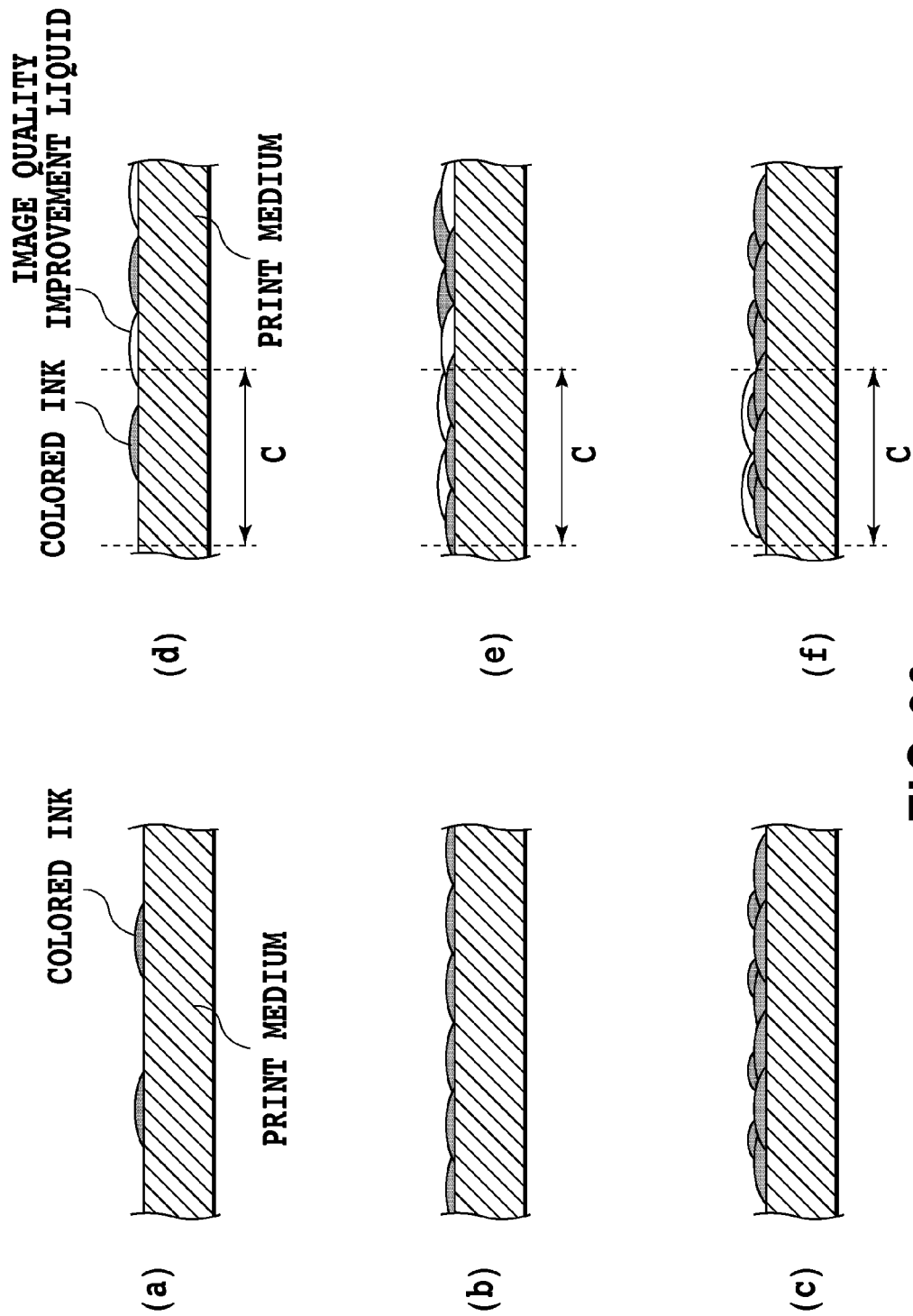
FIG. 20 is a diagram illustrating the relationship between both glossiness and image clarity and the state in which dots of the colored inks, dots of the image quality improvement liquid for gloss evenness, and dots of the image quality improvement liquid for ornamental printing are formed on the print medium.

Now, a manner of forming dots on the print medium with the image quality improvement liquid in order to exert the ornamental effect will be described with reference to FIG. 20. In FIG. 20, (a) to (c) show that only the dots of the colored ink are formed on the print medium in accordance with the print duty, similarly to (a) to (c) of FIG. 3, illustrating the (relationship between the dot formation state and both glossiness and image clarity) described above. In FIG. 20, dot density increases in the order of (a) to (c). FIG. 20(a) shows a gradation state called a highlight part. FIG. 20(b) shows a gradation state called a halftone part. FIG. 20(c) shows a gradation state called a shadow part. In FIG. 20, (d) to (f) show that the image quality improvement liquid for gloss evenness and/or for ornamental printing has been applied to (a) to (c), respectively. More specifically, in (d) to (f) of FIG. 20, the ornamental effect is to be exerted in an area on the print medium the range of which is shown by arrow C in the figures. Dots of the image quality improvement liquid for ornamental printing are formed in this area as required. Furthermore, the gloss is to be made in the entire area on the print medium except for the range shown by arrow C in the figures. Dots of the image quality improvement liquid for gloss evenness are formed in this area as required.

In the highlight part shown in FIG. 20(d), the image quality improvement liquid for gloss evenness has already been applied in the entire area on the print medium except for the range shown by arrow C. On the other hand, the image quality improvement liquid for gloss evenness has not been applied in the area on the print medium the range of which is shown by arrow C. Thus, the glossiness increases to approximately the middle level in the area where the gloss evenness is to be made and the glossiness remains low in the area where the ornamental effect is to be exerted. Hence, at this stage, the glossiness varies, allowing the ornamental effect to be exerted. If the image quality improvement liquid is applied in the area where the ornamental effect is to be exerted, the glossiness of the area increases, eliminating the difference in glossiness from the area in which the gloss is to be made even. Therefore, in the highlight part, the image quality improvement liquid is not applied in the area where the ornamental effect is to be exerted.

In the halftone part shown in FIG. 20(e), the image quality improvement liquid for gloss evenness has already been applied in the entire area on the print medium except for the range shown by arrow C. Thus, in the halftone part, dots of the colored ink with a high glossiness attributed to the color material thereof are mixed with dots of the image quality improvement liquid with a lower glossiness. Hence, the glossiness of the halftone part is suppressed approximately to the middle level. On the other hand, a low glossiness is required for the area where the ornamental effect is to be exerted. Consequently, the dots of the image quality improvement liquid for ornamental printing are formed in a layer over the dots of the colored ink. The colored ink with a high glossiness attributed to the color material thereof is thus coated with the dots of the image quality improvement liquid, which provides a lower glossiness. As a result, such a low glossiness as required can be achieved. Furthermore, this method eliminates the need for a significant change in the surface shape of the print surface, preventing the image clarity from being severely affected. Additionally, the image quality improvement liquid for gloss evenness may be pre-applied in the area where the ornamental effect is to be exerted. However, the image quality improvement liquid for gloss evenness need not be pre-applied in view of the total amount of the image quality improvement liquid used and a possible impact on the surface shape.

In the shadow part shown in FIG. 20(f), the glossiness is approximately at the middle level because of the high dot density of the colored ink. This eliminates the need to adjust the glossiness of the area where the gloss of the shadow part is to be made equal to that of the other gradation portions, preventing the image quality improvement liquid for gloss evenness from being applied in this area. On the other hand, a low glossiness is required for the area where the ornamental effect is to be exerted. Consequently, as in the case of the halftone part, the dots of the image quality improvement liquid for ornamental printing are formed in a layer over the dots of the colored ink. The colored ink with a high glossiness attributed to the color material thereof is thus coated with the dots of the image quality improvement liquid, which provides a lower glossiness. As a result, such a low glossiness as required can be achieved. Furthermore, this method eliminates the need for a significant change in the surface shape of the print surface, preventing the image clarity from being severely affected.

As described above, the present invention can exert the desired ornamental effect in each gradation portion.

FIG. 21 illustrates the relationship among the senses of gloss (image clarity and 20° mirror surface glossiness) obtained in (a) to (f) of FIG. 20. In FIG. 21, an "ornamental portion" refers to an area where the ornamental effect is to be exerted. A "non-ornamental portion" refers to any other print area. According to the present invention, in the ornamental portion, a low glossiness can be achieved. In the non-ornamental portion, approximately a middle glossiness that is higher than the glossiness of the ornamental portion can be achieved. The difference in glossiness between the areas appears to the eyes as the effect of ornamental printing resulting from the difference in gloss.

Second Embodiment

Now, a second embodiment of the present invention will be described. In the present embodiment, the first multipass printing with the colored ink and the image quality improvement liquid for gloss evenness is different from the second multipass printing with the image quality improvement liquid for ornamental printing in the number of passes.

In the first embodiment, substantially two passes are used to perform each of the first multipass printing with the colored ink and the image quality improvement liquid for gloss evenness and the second multipass printing with the image quality improvement liquid for ornamental printing. Thus, the target image is printed in a total of four passes. However, in the 2-pass printing with the colored ink, the landing position of the ink (dot formation position) may be irregular as a result of, for example, piece-to-piece variations in mechanical parts of the inkjet printing device main body or variation in the conveyance accuracy of the conveying operation. Such irregularity may lead to a local variation in density, resulting in image defects such as unwanted stripes and unevenness. The most effective method for avoiding such irregularity is to increase the number of passes in the multipass printing with the colored ink to three or four. However, this correspondingly reduces printing speed. On the other hand, in the multipass printing with the colorless and transparent ink such as the image quality improvement liquid, the irregularity of the landing position of the image quality improvement liquid is not perceived as variation in image density such as that occurring with the colored ink. Thus, the multipass printing with the image quality improvement liquid is unlikely to suffer image defects even with a small number of passes compared to the multipass printing with the colored ink.

Thus, in the present embodiment, the number of passes in the first multipass printing with the colored ink and the image quality improvement liquid for gloss evenness is set to be four. The number of passes in the second multipass printing with the image quality improvement liquid for ornamental printing is set to be two. Thus, the total number of the passes in the present embodiment is six.

Figure 22B:
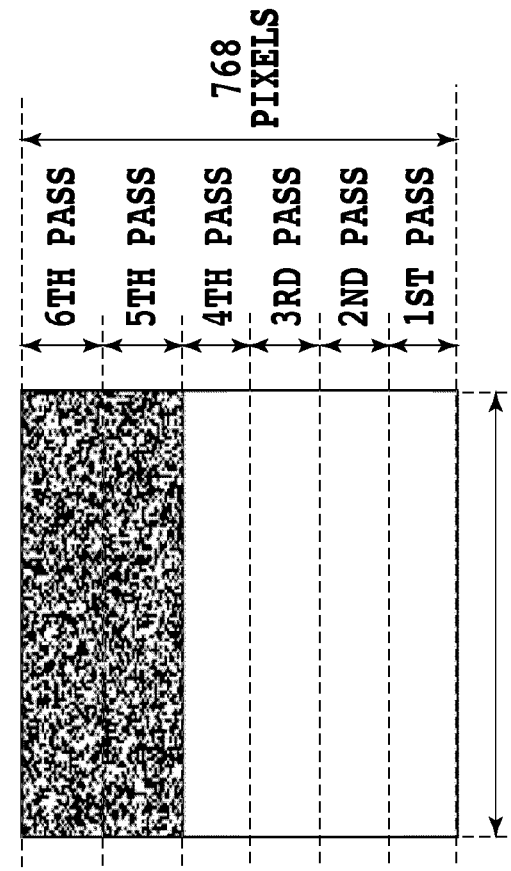
FIGS. 22A and 22B are diagrams illustrating mask patterns for the colored ink and for gloss evenness, and a mask pattern for ornamental printing according to a second embodiment of the present invention.
Figure 22A:
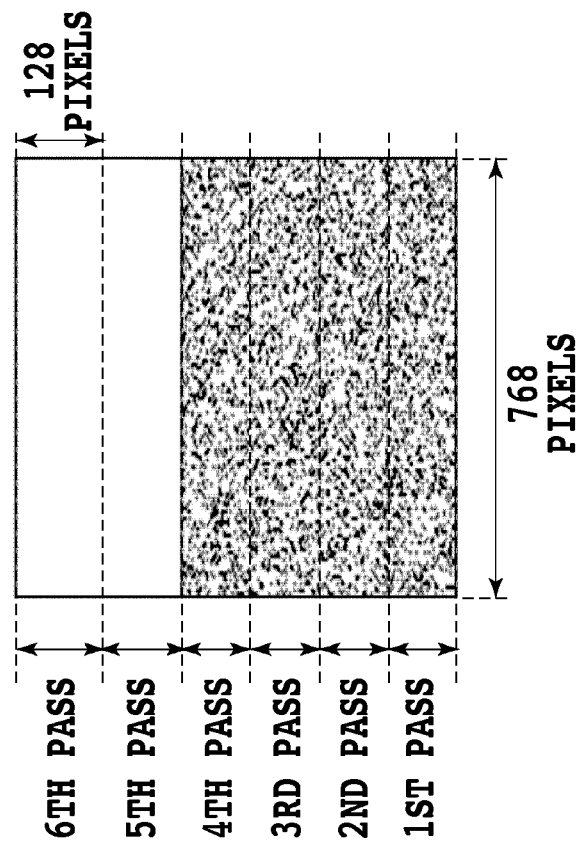

FIG. 22A shows a mask pattern for colored ink and a mask pattern for gloss evenness. FIG. 22B shows a mask pattern for ornamental printing. The vertical size of each mask pattern corresponds to 768 pixels; the number of the pixels is equal to that of the nozzles in the print head. Since the printing involves a total of six passes, each pass involves 128 pixels. This corresponds to 128 nozzles.

Figure 23:
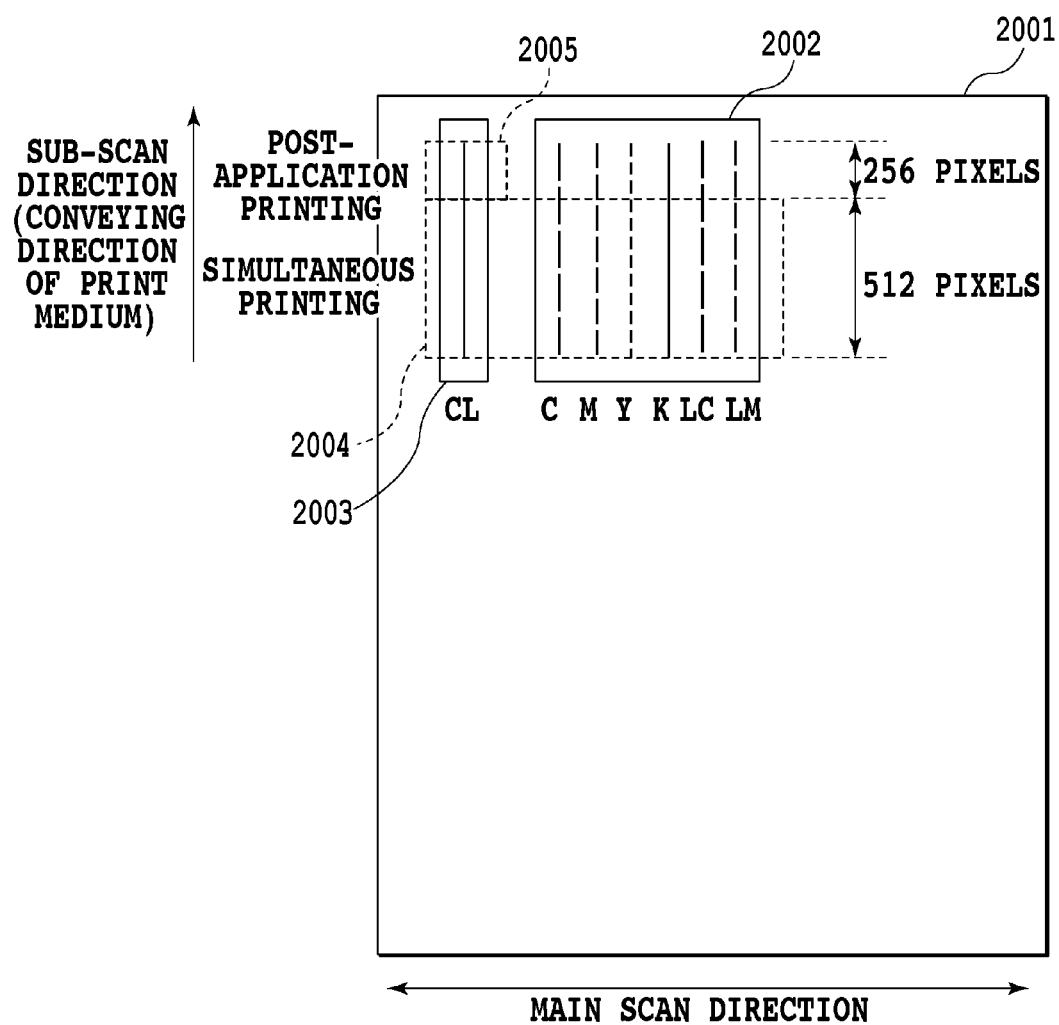
FIG. 23 is a schematic diagram showing a manner of applying the colored ink and the image quality improvement liquid onto the print medium according to the second embodiment of the present invention.

How the colored ink and the image quality improvement liquid are applied in the present example will be described with reference to FIG. 23. Components of the second embodiment which function in the same manner in FIG. 18 illustrating the above-described first embodiment will not be described. Reference numeral 2004 denotes an area of the head used for the colored ink and an area of the head used for the image quality improvement liquid in order to make the gloss even. As described above, the area 2004 is used for the printing during the first pass to the fourth pass, a total of four passes. Thus, the print width in the sub-scan direction is 128 pixels×4=512 pixels. This corresponds to 512 nozzles. Furthermore, reference numeral 2005 denotes an area used for ornamental printing of the head for the image quality improvement liquid. As described above, the area 2005 is used for the printing during the fifth and sixth passes, a total of two passes. Thus, the print width in the sub-scan direction is 128 pixels×2=256 pixels. This corresponds to 256 nozzles. In the first embodiment, the same number of nozzles are assigned to ornamental printing and to gloss evenness. However, in the second embodiment, the nozzles assigned to ornamental printing are greater in number than those assigned to gloss evenness. Thus, the nozzles assigned to gloss evenness and which can eject the image quality improvement liquid may be greater in number than those assigned to ornamental printing and which can eject the image quality improvement. Furthermore, the nozzles assigned to gloss evenness and which can eject the image quality improvement liquid are identical in number to those which can eject the colored ink.

As described above, according to the present embodiment, an increase in the number of passes in the first multipass printing with the colored ink serves to avoid a variation in density caused by an error in the landing of the colored ink resulting from piece-to-piece variations in mechanical parts of the inkjet printing device. On the other hand, a reduction in the number of passes in the second multipass printing with the image quality improvement liquid for ornamental printing enables minimization of a decrease in print speed while providing the function to apply the image quality improvement liquid for ornamental printing to post-application printing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-194736, filed Aug. 31, 2010, which is hereby incorporated by reference herein in its entirety.

What is claimed is:

1. An inkjet printing device using a print head comprising a first color liquid nozzle array in which a plurality of nozzles capable of ejecting ink containing a color material are arranged and a second improvement liquid nozzle array in which a plurality of nozzles capable of ejecting an image quality improvement liquid containing no color material are arranged, the inkjet printing device printing an image on a print medium by repeating a print scan in which the print head is moved in a main scan direction with ejecting the ink from the print head and a conveying operation of conveying the print medium in a conveying direction crossing the main scan direction, the inkjet printing device comprising:

first control means for, during a first print scan, allowing nozzles positioned on an upstream side of the first color liquid nozzle array in the conveying direction to eject the ink onto the print medium;

second control means for, during the first print scan, allowing nozzles positioned on an upstream side of the second improvement liquid nozzle array in the conveying direction to eject the image quality improvement liquid into an area on the print medium in which the ink has already been ejected; and third control means for, during a second print scan after the first print scan, allowing nozzles positioned on a downstream side of the second improvement liquid nozzle array in the conveying direction to eject the image quality improvement liquid into the area on the print medium into which the ink has already been ejected.

2. The inkjet printing device according to claim 1, wherein during first multipass printing in which the first print scan is carried out on an identical print area on the print medium a plurality of times, the first control means ejects the ink during each of the plurality of first print scans, and during the first multipass printing, the second control means ejects the image quality improvement liquid during each of the plurality of first print scans.

3. The inkjet printing device according to claim 1, wherein during first multipass printing in which the first print scan is carried out on an identical print area on the print medium a plurality of times, the first control means ejects the ink during each of the plurality of first print scans, during the first multipass printing, the second control means ejects the image quality improvement liquid during each of the plurality of first print scans, and the inkjet printing device further comprises:

first data generation means for generating first print data allowing the first control means to eject the ink, using a first mask pattern corresponding to the plurality of first print scans; and second data generation means for generating second print data allowing the second control means to eject the image quality improvement liquid, using a second mask pattern corresponding to the plurality of first print scans.

4. The inkjet printing device according to claim 1, wherein during second multipass printing in which the second print scan is carried out on an identical print area on the print medium a plurality of times, the third control means ejects the image quality improvement liquid during each of the plurality of second print scans, and the inkjet printing device further comprises:
third data generation means for generating third print data allowing the third control means to eject the image quality improvement liquid, using a third mask pattern corresponding to the plurality of second print scans.

5. The inkjet printing device according to claim 1, wherein during first multipass printing in which the first print scan is carried out on an identical print area on the print medium a plurality of times, the first control means ejects the ink during each of the plurality of first print scans,
during the first multipass printing, the second control means ejects the image quality improvement liquid during each of the plurality of first print scans,
during second multipass printing in which the second print scan is carried out on an identical print area on the print medium a plurality of times, the third control means ejects the image quality improvement liquid during each of the plurality of second print scans, and
the number of the plurality of first scans during the first multipass printing is different from the number of the plurality of second scans during the second multipass printing.

6. The inkjet printing device according to claim 1, wherein during first multipass printing in which the first print scan is carried out on an identical print area on the print medium a plurality of times, the first control means ejects the ink during each of the plurality of first print scans,
during the first multipass printing, the second control means ejects the image quality improvement liquid during each of the plurality of first print scans,
during second multipass printing in which the second print scan is carried out on an identical print area on the print medium a plurality of times, the third control means ejects the image quality improvement liquid during each of the plurality of second print scans, and
the number of the plurality of first scans during the first multipass printing is greater than the number of the plurality of second scans during the second multipass printing.

7. The inkjet printing device according to claim 1, wherein the number of the nozzles enabled by the first control means to eject the ink is identical to the number of the nozzles enabled by the second control means to eject the image quality improvement liquid and is equal to or greater than the number of the nozzles enabled by the third control means to eject the image quality improvement liquid.

8. An inkjet printing device comprising:
a print head capable of ejecting an ink containing a color material and an image quality improvement liquid for controlling gloss of an image;
a print scan unit configured to carry out a relative scan between the print head and a print medium in a main scan direction; and
a controlling unit configured to control the print head, wherein
the controlling unit controls the print head to eject the ink and the image quality improvement liquid on the print medium during relative scans, in such a manner that:
an image is formed in a prescribed print area on the print medium by ejecting the ink containing a color material and an image quality improvement liquid for controlling gloss of an image to the prescribed print area by a prescribed number of first relative scans so that gloss in the prescribed print area of the print medium is rendered substantially even; and
an image quality improvement liquid for controlling gloss of an image is ejected to the prescribed print area by a second relative scan to the prescribed print area after the prescribed number of first relative scans so that the gloss of a part of the prescribed print area in which the gloss has been rendered substantially even is changed.

9. The inkjet printing device according to claim 8, wherein the print head applies the image quality improvement liquid to a part where the ink containing a color material is not applied in the prescribed print area by the prescribed number of first relative scans.

10. The inkjet printing device according to claim 8, wherein the image quality improvement liquid ejected by the second relative scan is the same as the image quality improvement liquid ejected by the prescribed number of first relative scans.

11. An inkjet printing method for printing an image on a print medium by ejecting an ink containing a color material and an image quality improvement liquid for controlling gloss of an image on the print medium by a print head during relative scans between the print head and the print medium in a main scan direction, the method comprising the steps of:
forming an image in a prescribed print area by ejecting the ink containing a color material and an image quality improvement liquid for controlling gloss of an image to the prescribed print area by the print head by a prescribed number of first relative scans so that the gloss in the prescribed print area of the print medium is rendered substantially even; and
ejecting an image quality improvement liquid for controlling gloss of an image by the print head to the prescribed print area by a second relative scan to the prescribed print area after the prescribed number of first relative scans so that the gloss of a part of the prescribed print area in which the gloss has been rendered substantially even is changed.

12. The inkjet printing method according to claim 11, wherein the print head applies the image quality improvement liquid to a part where the ink containing a color material is not applied in the prescribed print area by the prescribed number of first relative scans.

13. The inkjet printing method according to claim 11, wherein the image quality improvement liquid ejected by the second relative scans is the same as the image quality improvement liquid ejected by the prescribed number of first relative scans.

14. The inkjet printing method according to claim 11, wherein
amounts of ejection of the ink containing a color material and the image quality improvement liquid ejected by the prescribed number of first relative scans to the prescribed print area for forming an image in the prescribed print area are determined on the basis of first data having R, G, B signals representing the colors of the image; and
an amount of ejection of the image quality improvement liquid ejected by the second relative scan to the prescribed print area is determined on the basis of the first data and other data.

15. The inkjet printing device according to claim 8, wherein
amounts of ejection of the ink containing a color material and the image quality improvement liquid ejected by the prescribed number of first relative scans to the prescribed print area for forming an image in the prescribed print area are determined on the basis of first data having R, G, B signals representing the colors of the image; and an amount of ejection of the image quality improvement liquid ejected by the second relative scan to the prescribed print area is determined on the basis of the first data and other data.

16. The inkjet printing device according to claim 8, wherein
the image quality improvement liquid is ejected to the prescribed print area by the second relative scan to the prescribed print area after the prescribed number of first relative scans so that the gloss of a part of the prescribed print area in which the gloss has been rendered substantially even is changed for providing an ornamental effect.

17. The inkjet printing method according to claim 11, wherein
the image quality improvement liquid is ejected to the prescribed print area by the second relative scan to the prescribed print area after the prescribed number of first relative scans so that the gloss of a part of the prescribed print area in which the gloss has been rendered substantially even is changed for providing an ornamental effect.

18. The inkjet printing device according to claim 8, wherein
the image quality improvement liquid ejected during the first and the second relative scans are substantially colorless and transparent.

19. The inkjet printing method according to claim 11, wherein
the image quality improvement liquid ejected during the first and the second relative scans are substantially colorless and transparent.

20. The inkjet printing device according to claim 8, wherein the controlling unit comprises:
a first data generating unit configured to generate first print data for controlling the print head to eject the ink during the first relative scans by using a first mask pattern for determining respective amounts of ejection of the ink by the prescribed number of first relative scans; and
a second data generating unit configured to generate second print data for controlling the print head to eject the image quality improvement liquid during the first relative scans by using a second mask pattern for determining respective amounts of ejection of the image quality improvement liquid by the prescribed number of first relative scans.

21. The inkjet printing device according to claim 8, wherein
the controlling unit controls the print head to eject the image quality improvement liquid by each of a plurality of second relative scans, and
the controlling unit comprises a third data generating unit configured to generate third print data for controlling the print head to eject the image quality improvement liquid during the second relative scans by using a third mask pattern for determining amounts of ejection of the image quality improvement liquid by each of the plurality of second relative scans.

22. The inkjet printing device according to claim 21, wherein the number of prescribed number of the first scans is different from the number of second relative scans.

23. The inkjet printing device according to claim 22, wherein the number of prescribed number of the first scans is greater than the number of second relative scans.

24. The inkjet printing device according to claim 23, further comprising a conveying unit configured to convey the print medium in a conveying direction crossing the relative scan direction between a relative scan and a following relative scan,
wherein the controlling unit controls the print head in such a manner that:
during the first relative scans, the ink is ejected to the prescribed print area from nozzles positioned on an upstream side of a first nozzle array in the conveying direction, and the image quality improvement liquid is ejected to the prescribed print area from nozzles positioned on an upstream side of a second nozzle array in the conveying direction, and
when carrying out the second relative scan, the image quality improvement liquid is ejected to the prescribed print area from nozzles positioned on a downstream side of the second nozzle array in the conveying direction.

25. The inkjet printing device according to claim 24, wherein the number of nozzles of the second nozzle array which the controlling unit allows to eject the image quality improvement liquid during the first relative scans is the same as the number of nozzles of the first nozzle array for ejecting the ink and is more than the number of nozzles which can be allowed to eject the image quality improvement liquid during the second relative scan.

26. The inkjet printing device according to claim 8, wherein the controlling unit controls the print head to eject an identical image quality improvement liquid to the prescribed print area during the first relative scan and the second relative scan.

27. The inkjet printing device according to claim 16, wherein the gloss of a part of the prescribed print area in which the gloss has been rendered substantially even is decreased for providing an ornamental effect.

28. The inkjet printing method according to claim 17, wherein the gloss of a part of the prescribed print area in which the gloss has been rendered substantially even is decreased for providing an ornamental effect.

* * * * *